(12) United States Patent  
Satori

(10) Patent No.: US 7,808,721 B2
(45) Date of Patent: *Oct. 5, 2010

(54) ZOOM LENS SYSTEM

(75) Inventor: Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 12/080,949

(22) Filed: Apr. 7, 2008

(65) Prior Publication Data

US 2008/0291544 A1 Nov. 27, 2008

Related U.S. Application Data

(63) Continuation of application No. 11/732,306, filed on Apr. 2, 2007, now Pat. No. 7,382,547.

(30) Foreign Application Priority Data

Apr. 4, 2006 (JP) .............................. 2006-102736

(51) Int. Cl.
G02B 15/14 (2006.01)
(52) U.S. Cl. .................. 359/689; 359/682; 359/686
(58) Field of Classification Search .................. 359/680, 359/681, 682, 686, 689
See application file for complete search history.

(56) References Cited

U.S. PATENT DOCUMENTS

| 5,331,462 | A | 7/1994 | Yano |
| 6,930,839 | B2 | 8/2005 | Hagimori et al. |
| 7,079,325 | B2 * | 7/2006 | Konno ........................ 359/682 |
| 7,382,547 | B2 * | 6/2008 | Satori ........................ 359/682 |

FOREIGN PATENT DOCUMENTS

| JP | 2004-318099 | 11/2004 |
| JP | 2004-318106 | 11/2004 |
| JP | 2004-318107 | 11/2004 |

* cited by examiner

Primary Examiner—Scott J Sugarman
(74) Attorney, Agent, or Firm—Kenyon & Kenyon LLP

(57) ABSTRACT

A zoom lens system which includes, in order from an object side, a first lens unit having a negative refractive power; a second lens unit having a positive refractive power; and a third lens unit having a positive refractive power, a space between the lens units is changed to perform magnification change; a lens of the second lens unit closest to an image side has a concave surface which faces the image side; a lens of the third lens unit closest to the object side is a negative lens whose concave surface faces the object side; and during the magnification change, the space between the second lens unit and the third lens unit is larger in a telephoto end than in a wide-angle end.

17 Claims, 20 Drawing Sheets

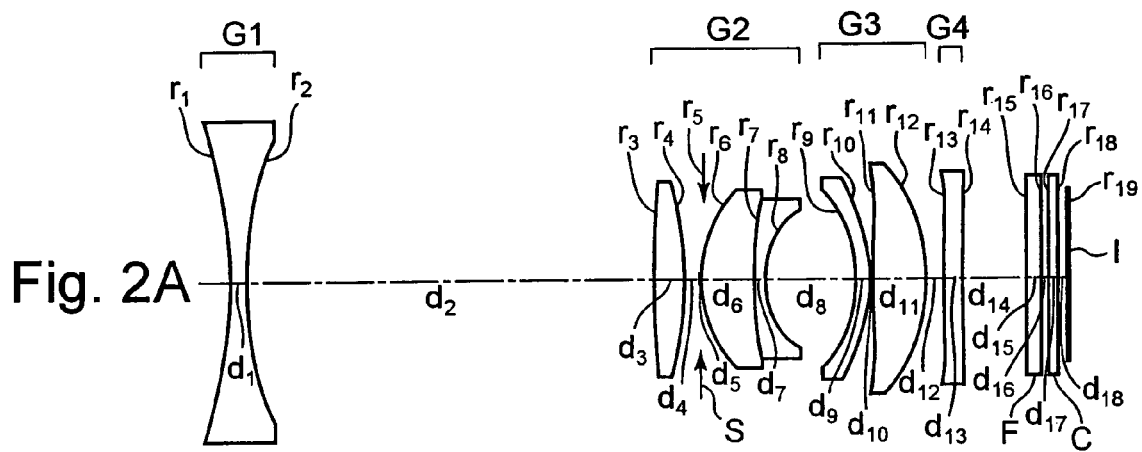
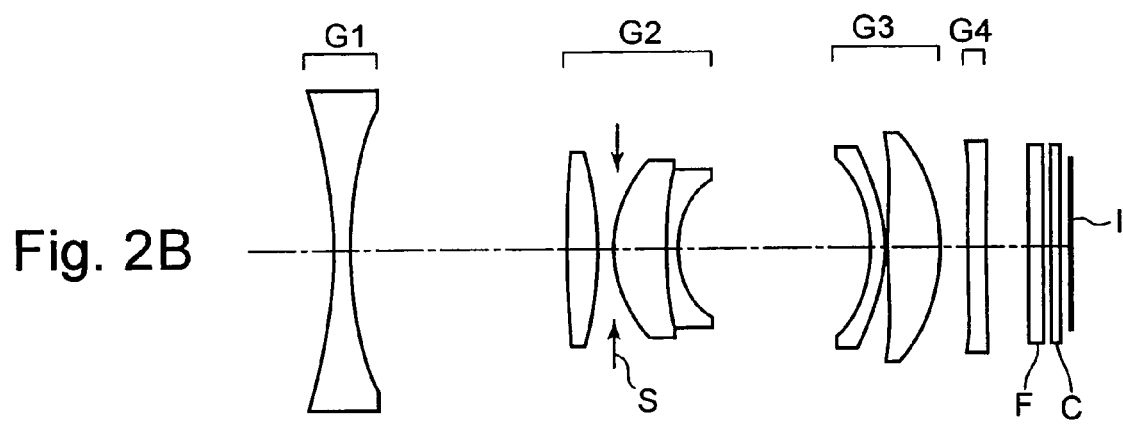
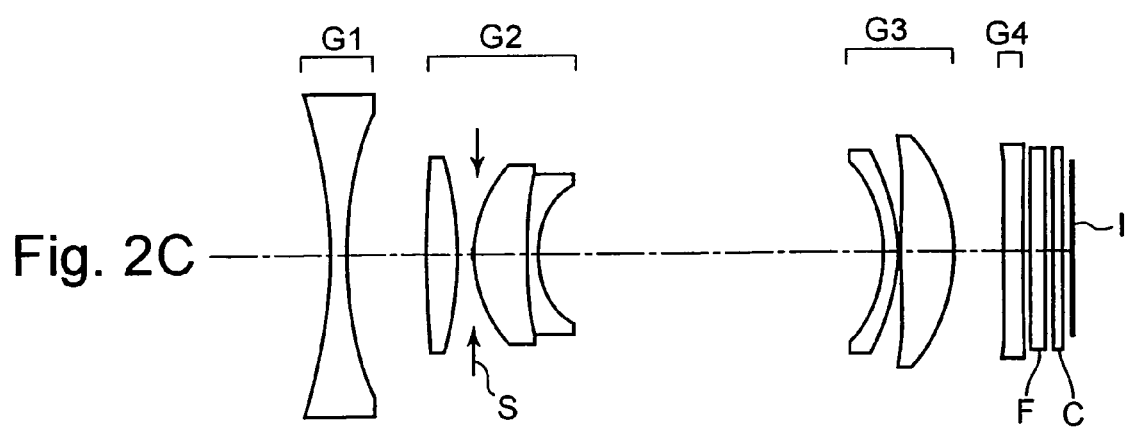

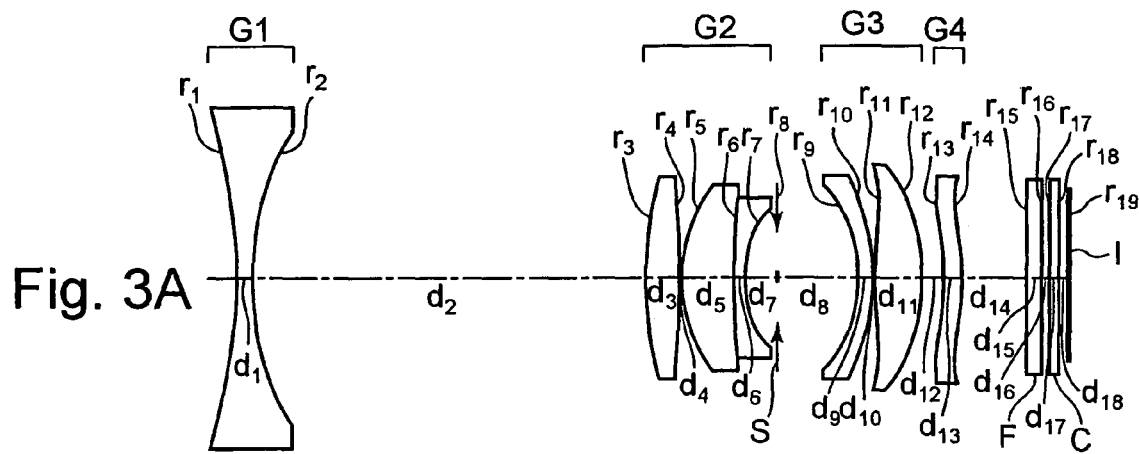
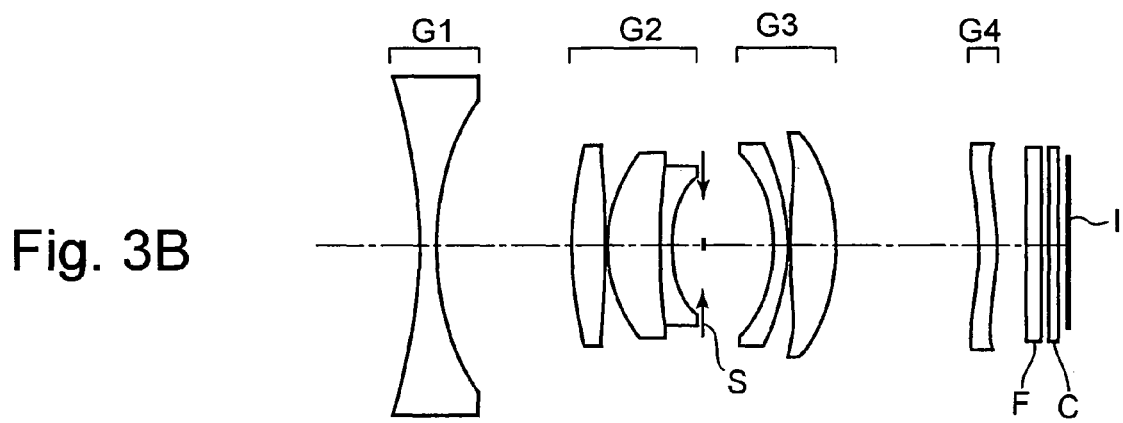
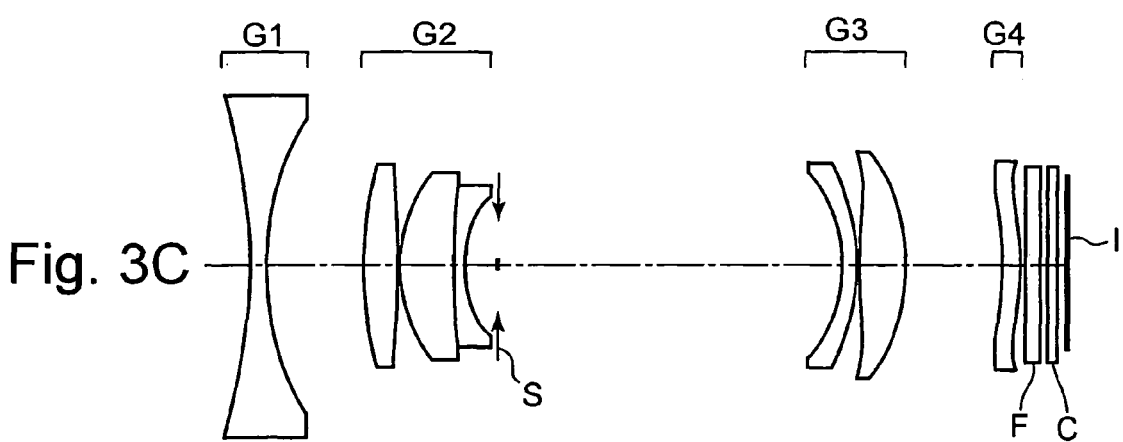

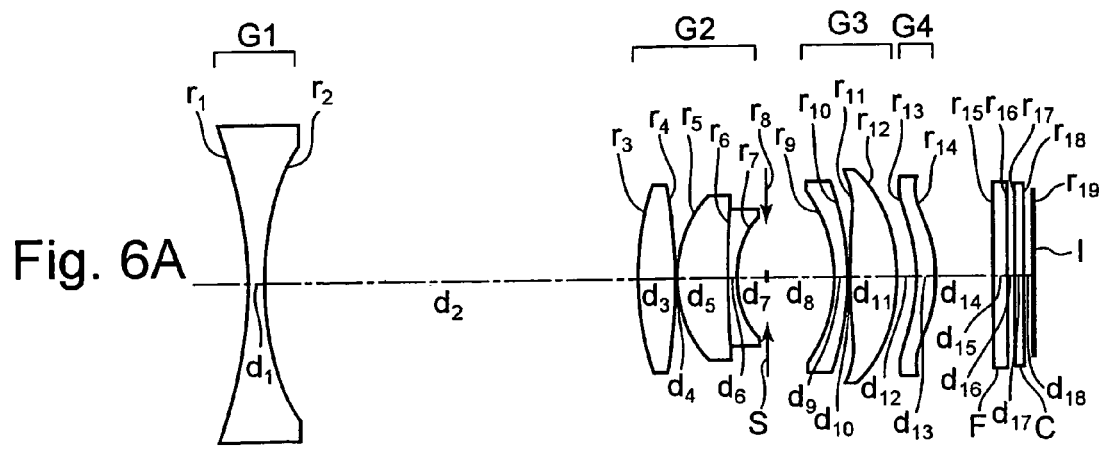
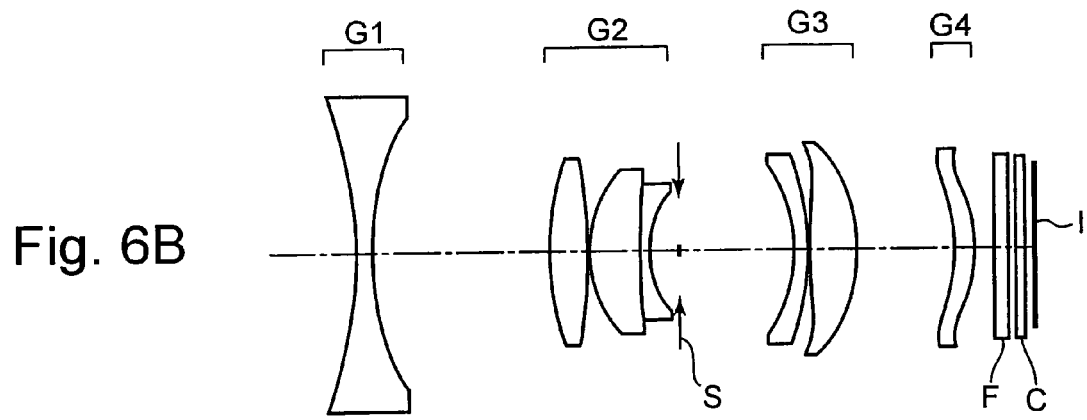
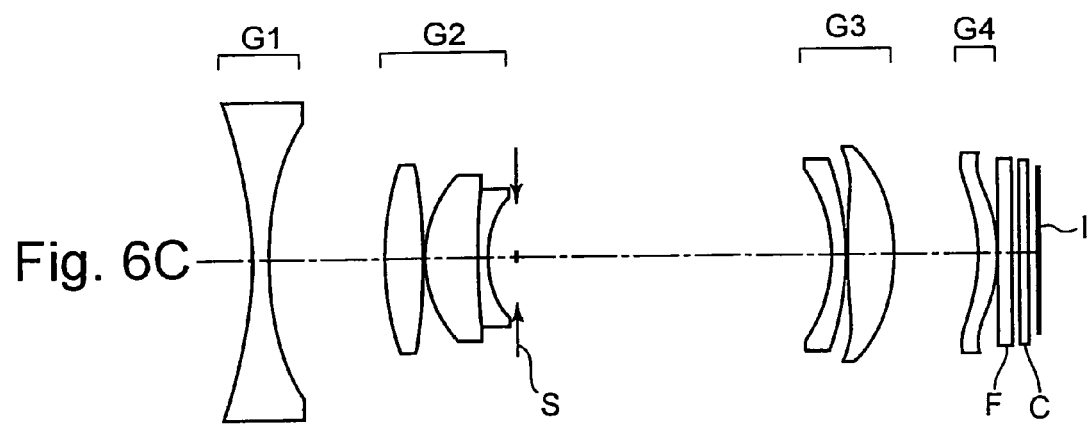

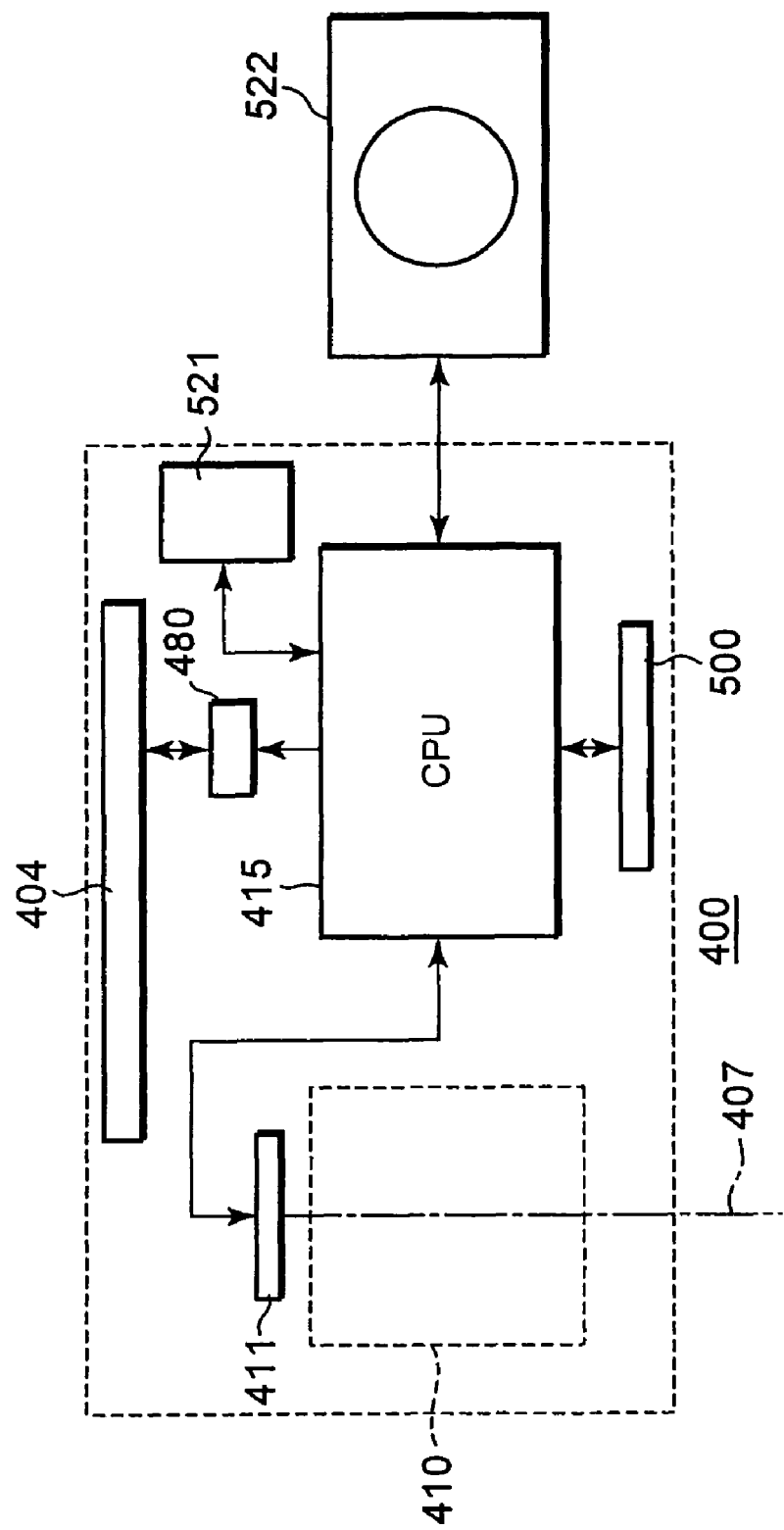

ZOOM LENS SYSTEM

CROSS REFERENCE TO RELATED APPLICATIONS

This application is a continuation of U.S. patent application Ser. No. 11/732,306 filed on Apr. 2, 2007, now U.S. Pat. No. 7,382,547 which claims priority to Japanese Application No. 2006-102736 filed on Apr. 4, 2006, which is expressly incorporated herein in its entirety by reference thereto.

BACKGROUND OF THE INVENTION

1. Field of the Invention

The present invention relates to a zoom lens system.

2. Description of the Related Art

In recent years, a digital camera has received considerable attention as the next-generation camera instead of a 35 mm film camera. Furthermore, the camera has several categories in a broad range from a multi-functional type for business use to a portable popular type. The present invention especially pays attention to the portable popular type of category, and aims to provide a technology of realizing a thin video camera and a thin digital camera while securing high image qualities.

Thinning of the camera in a depth direction is hampered most by a thickness of an optical system, especially a zoom lens system from the surface closest to an object side to an image pickup surface. In recent years, it has been a mainstream to use a so-called collapsible lens barrel so that the optical system is projected from a camera body during photographing and stored in the camera body during carrying.

To realize the thinning and miniaturization, an image sensor may be miniaturized. However, to obtain the same number of pixels, pixel pitches need to be reduced. In this case, the image sensor has an insufficient sensitivity. This has to be covered by the optical system. When the pixel pitches decrease, the image quality is adversely affected by deterioration of a resolution due to diffraction. This also has to be covered by the optical system. Therefore, a bright optical system having a small F-number is required. Furthermore, to satisfy a demand that a user desires to enjoy a broad range of photographing, a zoom lens system having a large angle of field in a wide-angle end and having a large zoom ratio is demanded.

Examples of a comparatively compact zoom lens system having a zoom ratio which is as high as about threefold and having a large angle of field are disclosed in Japanese Patent Application Laid-Open Nos. 2004-318099, 2004-318106 and 2004-318107.

Each of these zoom lens systems has, in order from an object side, a first lens unit having a negative refractive power, a second lens unit having a positive refractive power and a third lens unit having a positive refractive power. An axial space between lenses constituting the first lens unit is reduced, the first lens unit is constituted of only one negative lens, or an inner focusing system is adopted. In consequence, a zoom lens system having a comparatively compact lens barrel when collapsed is realized.

SUMMARY OF THE INVENTION

A zoom lens system of the present invention comprises, in order from an object side, a first lens unit having a negative refractive power, a second lens unit having a positive refractive power and a third lens unit having a positive refractive power, a space between the lens units is changed to perform magnification change, a lens of the second lens unit closest to an image side has a concave surface which faces the image side, a lens of the third lens unit closest to the object side is a negative lens whose concave surface faces the object side, and the space between the second lens unit and the third lens unit becomes larger in a telephoto end than in a wide-angle end for the magnification change.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view in a wide-angle end, FIG. 1B is a sectional view in an intermediate state, and FIG. 1C is a sectional view in a telephoto end;

FIGS. 2A to 2C are sectional views of Example 2 of a zoom lens system according to the present invention when focused on an infinite object, FIG. 2A is a sectional view in a wide-angle end, FIG. 2B is a sectional view in an intermediate state, and FIG. 2C is a sectional view in a telephoto end;

FIGS. 3A to 3C are sectional views of Example 3 of a zoom lens system according to the present invention when focused on an infinite object, FIG. 3A is a sectional view in a wide-angle end, FIG. 3B is a sectional view in an intermediate state, and FIG. 3C is a sectional view in a telephoto end;

FIG. 4A is a sectional view in a wide-angle end, FIG. 4B is a sectional view in an intermediate state, and FIG. 4C is a sectional view in a telephoto end;

FIG. 5A is a sectional view in a wide-angle end, FIG. 5B is a sectional view in an intermediate state, and FIG. 5C is a sectional view in a telephoto end;

FIGS. 6A to 6C are sectional views of Example 6 of a zoom lens system according to the present invention when focused on an infinite object, FIG. 6A is a sectional view in a wide-angle end, FIG. 6B is a sectional view in an intermediate state, and FIG. 6C is a sectional view in a telephoto end;

FIG. 7A is a sectional view in a wide-angle end, FIG. 7B is a sectional view in an intermediate state, and FIG. 7C is a sectional view in a telephoto end;

FIG. 8A is an aberration diagram in the wide-angle end, FIG. 8B is an aberration diagram in the intermediate state, and FIG. 8C is an aberration diagram in the telephoto end;

FIG. 9A is an aberration diagram in the wide-angle end, FIG. 9B is an aberration diagram in the intermediate state, and FIG. 9C is an aberration diagram in the telephoto end;

FIG. 10A is an aberration diagram in the wide-angle end, FIG. 10B is an aberration diagram in the intermediate state, and FIG. 10C is an aberration diagram in the telephoto end;

FIG. 11A is an aberration diagram in the wide-angle end, FIG. 11B is an aberration diagram in the intermediate state, and FIG. 11C is an aberration diagram in the telephoto end;

FIG. 12A is an aberration diagram in the wide-angle end, FIG. 12B is an aberration diagram in the intermediate state, and FIG. 12C is an aberration diagram in the telephoto end;

FIG. 13A is an aberration diagram in the wide-angle end, FIG. 13B is an aberration diagram in the intermediate state, and FIG. 13C is an aberration diagram in the telephoto end;

FIG. 14A is an aberration diagram in the wide-angle end, FIG. 14B is an aberration diagram in the intermediate state, and FIG. 14C is an aberration diagram in the telephoto end;

FIG. 22 is a schematic block diagram showing a main part of a control system related to photographing, image recording and image display of the cellular phone of FIG. 19.

DETAILED DESCRIPTION OF THE PREFERRED EMBODIMENTS

Figure 1A:
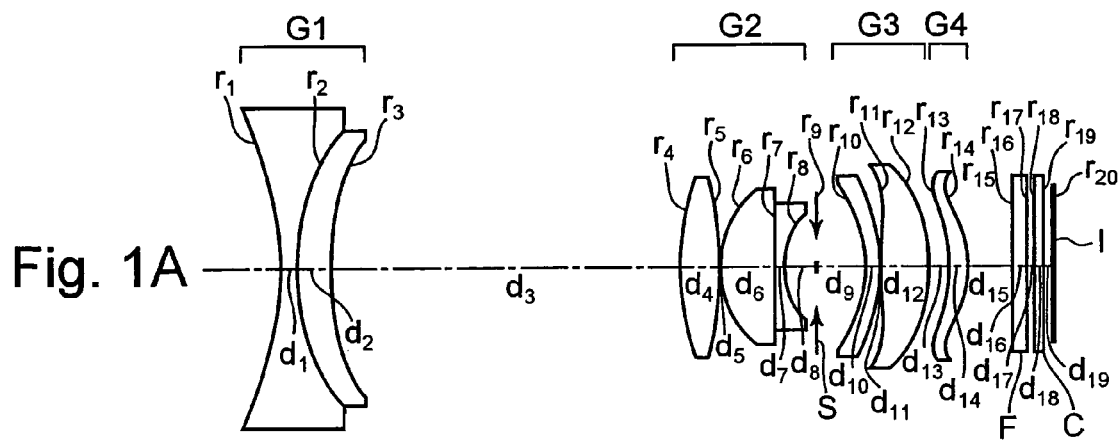
FIGS. 1A to 1C are sectional views of Example 1 of a zoom lens system according to the present invention when focused on an infinite object.

The present invention will hereinafter be described in detail in accordance with examples.

As described above, a zoom lens system of the present invention comprises a first lens unit having a negative refractive power. According to such a negative-lead type lens constitution, even when a total length is reduced, an appropriate zoom ratio can be secured, and an angle of field in a wide-angle end is easily secured. Furthermore, even when the angle of field becomes large in the wide-angle end, an outer diameter of a lens closest to an object side can comparatively be reduced.

Moreover, a lens of a second lens unit closest to an image side has a concave surface facing the image side, and a lens of a third lens unit closest to the object side is a negative lens whose concave surface faces the object side. In consequence, the third lens unit efficiently and easily cancels off-axial aberrations generated in the first and second lens units. Specifically, the concave surface of the second lens unit closest to the image side kicks up a ray to increase a ray height. In this state, an off-axial ray is allowed to enter the negative lens of the third lens unit closest to the object side, whose concave surface faces the object side. In consequence, an astigmatism, a distortion and a chromatic aberration of magnification generated in the first lens unit can be cancelled by the third lens unit. Since the second lens unit bears a function of magnification change, a spherical aberration, the distortion and a coma are easily generated, but the aberrations can be cancelled by the third lens unit. When this third lens unit is moved independently of another lens unit during the magnification change, an aberration fluctuation in the whole magnification change region is successfully minimized.

As described later, it is advantageous to adopt an inner focusing system for achieving a compact lens barrel. However, since the above lens constitution is adopted, the aberration fluctuations during photographing of a short-distance object can be minimized in a case where the third lens unit is used to perform inner-focusing. During the magnification change, the lens units are moved so that a space between the second lens unit and the third lens unit is larger in a telephoto end than in the wide-angle end. In consequence, the third lens unit can have a function of increasing magnification in a magnification change range from the vicinity of an intermediate focal length state to the telephoto end. Therefore, a burden on the second lens unit which is a main magnification change unit can be reduced, and the aberration fluctuation during the magnification change can further be reduced. Since a movement amount of the second lens unit can be reduced, the constitution also contributes to the compact lens barrel.

In addition, when the following constitutions and conditions are satisfied, a further compact zoom lens system can be realized, and a satisfactory optical performance can be secured.

The first lens unit may be configured to move along a locus which is convex toward the image side during the magnification change. The second lens unit may be moved to the only object side. According to such a constitution, a telecentricity on the image-side is improved, and a ray can efficiently be allowed to enter an image sensor (e.g., a CCD image sensor). Since a back focus (a distance between a rearmost lens surface of the zoom lens system and an image surface thereof) can be lengthened, it is possible to secure a space where members such as an optical low pass filter and an infrared cut filter are arranged. While an appropriate exit pupil distance is kept, the total length of the zoom lens system can be reduced.

The focusing on an object at a short distance may be performed by moving the third lens unit. An inner focusing system by moving the third lens unit is advantageous for miniaturization as compared with a focus system by moving the zoom lens system as a whole or by moving the first lens unit. For example, since the moving lens unit is light, a load on a motor is small, and the total length does not increase. Since a driving motor can be disposed in the lens barrel, a size of the lens barrel in a diametric direction does not increase.

The third lens unit may be constituted of two lenses including a negative lens and a positive lens in order from an object side. An off-axial ray emitted from the second lens unit and passed through the third lens unit easily forms a large angle with respect to an optical axis. However, according to such a constitution, the angle of the off-axial ray passed through the third lens unit can be reduced with respect to the optical axis. Therefore, even when the third lens unit is moved, the fluctuations of the off-axial aberrations, especially an astigmatism and a coma can be reduced. Since an axial marginal ray has a small angle with respect to the optical axis, the fluctuations of the spherical aberration during the focusing are reduced. Therefore, it is possible to secure a satisfactory performance during the focusing on the object at the short distance by the third lens unit.

At this time, it is preferable that the negative lens and the positive lens of the third lens unit satisfy the following condition:

$$-4.2 < f_{3n}/f_{3p} < -1.1 \quad (1),$$

in which $f_{3n}$ is a focal length of the negative lens of the third lens unit, and $f_{3p}$ is a focal length of the positive lens of the third lens unit.

If a value of $f_{3n}/f_{3p}$ exceeds an upper limit of −1.1 in the condition (1), an excessive amount of a negative distortion in the wide-angle end is generated. If the value lowers below a lower limit of −4.2, a function of reducing the angle of the off-axial ray passed through the third lens unit diminishes. Therefore, the fluctuations of the astigmatism and the coma during the focusing of the third lens unit increase, and it is difficult to secure an optical performance during the photographing of the object at the short distance.

It is more preferable to satisfy the following condition:

$$-3.50 < f_{3n}/f_{3p} < -1.50 \quad (1)'.$$

In addition, it is further preferable to satisfy the following condition:

$$-2.80 < f_{3n}/f_{3p} < -1.90 \quad (1)''.$$

The negative lens of the third lens unit closest to the object side may satisfy the following condition:

$$-7.90 < SF_{3n} < -1.20 \quad (2).$$

Here $SF_{3n}$ is defined by "$SF_{3n} = (R_{3lf} + R_{3lr})/(R_{3lf} - R_{3lr})$" and in which $R_{3lf}$, $R_{3lr}$ are paraxial radii of curvatures of an object side surface and an image-side surface of the negative lens of the third lens unit, respectively.

If a value of $SF_{3n}$ exceeds an upper limit of −1.20 in the condition (2), the function of reducing the angle of the off-axial ray passed through the third lens unit diminishes. Therefore, the fluctuations of the astigmatism and the coma during the focusing of the third lens unit increase, and the optical performance during the photographing of the object at the short distance cannot be secured. If the value lowers below a lower limit of −7.90, the Petzval sum deteriorates. The field curvature is overcorrected, and the image surface largely curves toward a plus side. An excessively large positive distortion is generated in the telephoto end. Furthermore, since a lens peripheral portion protrudes toward the object side, the negative lens interferes with another lens disposed on the front side thereof or a mechanical member of the lens barrel in a collapsed state, and it is difficult to reduce the thickness of the lens barrel.

It is more preferable to satisfy the following condition:

$$-6.90 < SF_{3n} < -2.20 \quad (2)'.$$

In addition, it is further preferable to satisfy the following condition:

$$-5.90 < SF_{3n} < -3.20 \quad (2)''.$$

Moreover, the negative lens of the third lens unit closest to the object side may satisfy the following conditions:

$$1.75 < n_{d3n} < 2.20 \quad (3); \text{ and}$$

$$13.0 < v_{d3n} < 33.0 \quad (4),$$

in which $n_{d3n}$ and $v_{d3n}$ are a refractive index and the Abbe number of the negative lens of the third lens unit closest to the object side for the d-line, respectively.

The condition (3) is a condition concerning a refractive index of the lens in order to appropriately inhibit the generation of the aberration. When the refractive index is increased to a certain degree, the curvature of the lens surface can be reduced, and the generation of the aberration can be minimized. If a value of $n_{d3n}$ exceeds an upper limit of 2.20 in the condition (3), a vitreous material cannot easily be obtained, mass productivity deteriorates, and costs tend to increase. If the value lowers below a lower limit of 1.75, the curvature of the lens surface has to be increased in order to obtain a desired refractive power. Therefore, excessively large spherical aberration and coma are generated, and it is difficult to obtain a satisfactory performance in the whole magnification change region.

The condition (4) is a condition concerning the Abbe number of the lens, for appropriately correcting an axial chromatic aberration. If a space between the lenses constituting the first lens unit is reduced or the first lens unit is constituted of only one negative lens in order to achieve a compact constitution, the chromatic aberration of the first lens unit tends to be undercorrected. To solve the problem, the Abbe number of the negative lens of the third lens unit can be set to be to appropriately correct the chromatic aberration generated in the first lens unit. If a value of $v_{d3n}$ exceeds an upper limit of 33.0 in the condition (4), a dispersion of the vitreous material is excessively small, and the axial chromatic aberration and the chromatic aberration of magnification are incompletely corrected. If the value lowers below a lower limit of 13.0, the vitreous material has an excessive anomalous dispersion property, and it is difficult to correct a secondary spectrum of the axial chromatic aberration and the chromatic aberration of magnification. Therefore, a color blur is easily generated in a photographed image. Alternatively, the number of the lenses constituting the zoom lens system has to be increased in order to correct the secondary spectrum of the chromatic aberration, the costs increase, and the zoom lens system cannot be constituted to be compact.

Regarding the condition (3), it is more preferable to satisfy the following condition:

$$1.83 < n_{d3n} < 2.05 \quad (3)'.$$

Furthermore, it is further preferable to satisfy the following condition:

$$1.90 < n_{d3n} < 1.95 \quad (3)''.$$

Regarding the condition (4), it is more preferable to satisfy the following condition:

$$15.0 < v_{d3n} < 29.0 \quad (4)'.$$

Furthermore, it is further preferable to satisfy the following condition:

$$17.0 < v_{d3n} < 22.0 \quad (4)''.$$

In addition, the space between the second lens unit and the third lens unit may satisfy the following condition:

$$0.35 < d_{23}/f_w < 1.25 \quad (5),$$

in which $d_{23}$ is an axial space between the second lens unit and the third lens unit in the wide-angle end, and $f_w$ is a focal length of the zoom lens system in the wide-angle end.

If a value of $d_{23}/f_w$ exceeds an upper limit of 1.25 in the condition (5), the field curvature and the distortion in the wide-angle end are insufficiently corrected. If the value lowers below a lower limit of 0.35, a space for moving the lens units during the focusing of the third lens unit falls short, and the shortest object distance that can be focused is limited.

It is more preferable to satisfy the following condition:

$$0.45 < d_{23}/f_w < 1.00 \tag{5}'$$

Furthermore, it is further preferable to satisfy the following condition:

$$0.55 < d_{23}/f_w < 0.75 \tag{5}''$$

To realize a compact optical system, it is preferable that the first lens unit is constituted of two or less lenses.

To achieve a further compact constitution, the first lens unit may be constituted of only one negative lens.

At this time, since the aberrations generated in the first lens unit cannot be cancelled in the unit, the aberration generation needs to be inhibited to such a realistic extent that the photographed image can be appreciated. Therefore, it is preferable to develop the following various devises.

It is preferable that the negative lens of the first lens unit satisfies the following condition:

$$75.0 < v_{d1n} < 105.0 \tag{6}$$

in which $v_{d1n}$ is the Abbe number of the negative lens of the first lens unit.

If a value of $v_{d1n}$ exceeds an upper limit of 105.0 in the condition (6), it is difficult to obtain the vitreous material, the mass productivity deteriorates, and the costs easily increase. If the value lowers below a lower limit of 75.0, an excessively large chromatic aberration is generated, and the color blur of the photographed image is easily generated.

It is more preferable to satisfy the following:

$$80.0 < v_{d1n} < 100.0 \tag{6}'$$

In addition, it is further preferable to satisfy the following:

$$90.0 < v_{d1n} < 96.0 \tag{6}''$$

Moreover, it is preferable that the negative lens of the first lens unit satisfies the following condition:

$$0.01 < SF_{1n} < 1.00 \tag{7}$$

Here $SF_{1n}$ is defined by "$SF_{1n} = (R_{1lf} + R_{1lr})/(R_{1lf} - R_{1lr})$" and in which $R_{1lf}$, $R_{1lr}$ are paraxial radii of curvatures of an object side surface and an image-side surface of the negative lens of the first lens unit, respectively.

The condition (7) is a condition for achieving a good balance between the miniaturization and the aberrations. If a value of $SF_{1n}$ exceeds an upper limit of 1.00 in the condition (7), an excessively large spherical aberration is generated in the first lens unit. Therefore, the fluctuations of the spherical aberration during the magnification change increase, and it is difficult to secure a satisfactory optical performance in the whole magnification change region. If the value lowers below a lower limit of 0.01, an absolute value of the curvature of a concave surface on an incidence side increases, and the distortion and the astigmatism in the wide-angle end are not easily suppressed.

It is more preferable to satisfy the following condition:

$$0.07 < SF_{1n} < 0.70 \tag{7}'$$

In addition, it is further preferable to satisfy the following condition:

$$0.13 < SF_{1n} < 0.40 \tag{7}''$$

Moreover, it is preferable that the negative lens of the first lens unit has aspherical surfaces on the object side surface and the image-side surface. According to such a constitution, the field curvature and the distortion can effectively be corrected.

At this time, the aspherical surface of the first lens unit may be an aspherical surface formed so that the negative refractive power of a portion on the surface weakens as the portion comes away from the optical axis. At the first lens unit, the off-axial ray having a large incidence height easily has a large incidence angle. Therefore, according to the above constitution, the incidence angle of the off-axial ray having the large incidence height is inhibited from being excessively enlarged, and the generation of the aberrations can easily be inhibited.

The second lens unit is a unit which mainly performs the magnification change. Therefore, to obtain a satisfactory optical performance, the generation of the aberration needs to be minimized. Therefore, it is preferable to develop the following devises.

As described above, it is preferable that the surface of the second lens unit closest to the image side is a concave surface facing the image side. At this time, it is preferable to satisfy the following condition:

$$0.44 < R_{2r}/f_w < 1.00 \tag{8}$$

in which $R_{2r}$ is a par axial radius of curvature of the surface of the second lens unit closest to the image side, and $f_w$ is a focal length of the zoom lens system in the wide-angle end.

If a value $R_{2r}/f_w$ exceeds an upper limit of 1.00 in the condition (8), the refractive power of this surface excessively weakens, and an effect of kicking up the ray is reduced. Then, the ray entering the third lens unit does not have a sufficient height. Therefore, off-axial aberrations such as the astigmatism, the distortion and the chromatic aberration of magnification generated in the first lens unit cannot be cancelled. If the value lowers below a lower limit of 0.44, the refractive power of this surface excessively strengthens. Therefore, excessively large spherical aberration and coma are generated in the second lens unit, and it is difficult to obtain a satisfactory optical performance in the whole magnification change region.

It is more preferable to satisfy the following condition:

$$0.50 < R_{2r}/f_w < 0.80 \tag{8}'$$

In addition, it is further preferable to satisfy the following condition:

$$0.56 < R_{2r}/f_w < 0.68 \tag{8}''$$

The second lens unit may be constituted of, in order from the object side, a positive lens and a cemented lens of a positive lens and a negative lens. According to such a constitution, a front principal point of the second lens unit can be shifted toward the object side. Therefore, the movement amount of the second lens unit during the magnification change can be reduced. Since the cemented lens is disposed, the axial chromatic aberration generated in the second lens unit can be corrected.

Moreover, when the positive lens closest to the object side has two aspherical surfaces, the coma and spherical aberration generated in the second lens unit can efficiently be corrected. Furthermore, when the aspherical surface is disposed on the concave surface of the second lens unit closest to the image side, the coma and the spherical aberration can more effectively be corrected.

Furthermore, it is preferable that the vitreous material of the lens of the second lens unit closest to the image side satisfies the following conditions:

$$1.75 < n_{d2r} < 2.20 \tag{9; and}$$

$$15.0 < v_{d2r} < 50.0 \tag{10}$$

in which $n_{d2r}$ and $v_{d2r}$ are a refractive index and the Abbe number of the lens of the second lens unit closest to the image side for the d-line.

If a value of $n_{d2r}$ exceeds an upper limit of 2.20 in the condition (9), it is difficult to obtain the vitreous material, the mass productivity deteriorates, and the costs easily increase. If the value lowers below a lower limit of 1.75, the curvature of the lens surface needs to be enlarged in order to obtain a desired refractive power, the spherical aberration and the coma are largely generated, and the satisfactory performance cannot be obtained in the whole magnification change region.

If a value of $v_{d2r}$ exceeds an upper limit of 50.0 in the condition (10), the chromatic aberration of the second lens unit is undercorrected. If the value lowers below a lower limit of 15.0, the vitreous material tends to have an excessive anomalous dispersion property, and it is difficult to correct the secondary spectra of the axial chromatic aberration and chromatic aberration of magnification. Therefore, the color blur is easily generated in the photographed image.

Regarding the condition (9), it is more preferable to satisfy the following condition:

$$1.82 < n_{d2r} < 2.10 \tag{9}'$$

Furthermore, it is more preferable to satisfy the following condition.

$$1.98 < n_{d2r} < 2.05 \tag{9}''$$

Regarding the condition (10), it is more preferable to satisfy the following condition:

$$19.0 < v_{d2r} < 43.0 \tag{10}'$$

Furthermore, it is more preferable to satisfy the following condition:

$$23.0 < v_{d2r} < 26.0 \tag{10}''$$

In addition, it is preferable that a focal length $f_1$ of the first lens unit satisfies the following condition:

$$-4.80 < f_1/f_w < -1.20 \tag{11}$$

If a value of $f_1/f_w$ lowers below a lower limit of $-4.80$ in the condition (11), the power of the first lens unit excessively weakens, and the total length of the zoom lens system easily increases. If the value exceeds an upper limit of $-1.20$, the power of the first lens unit excessively strengthens, and it is difficult to correct the aberration.

Furthermore, it is more preferable to satisfy the following condition:

$$-4.00 < f_1/f_w < -1.80 \tag{11}'$$

In addition, it is further preferable to satisfy the following condition:

$$-3.20 < f_1/f_w < -2.40 \tag{11}''$$

It is preferable that a focal length $f_2$ of the second lens unit satisfies the following condition:

$$1.00 < f_2/f_w < 2.00 \tag{12}$$

If a value of $f_2/f_w$ exceeds an upper limit of 2.00 in the condition (12), the power of the second lens unit excessively weakens, and the movement amount of the second lens unit during the magnification change easily increases. If the value lowers below a lower limit of 1.00, the power of the second lens unit excessively strengthens, and it is difficult to correct the aberration.

It is more preferable to satisfy the following condition:

$$1.30 < f_2/f_w < 1.95 \tag{12}'$$

In addition, it is further preferable to satisfy the following condition:

$$1.62 < f_2/f_w < 1.80 \tag{12}''$$

It is preferable that a focal length $f_3$ of the third lens unit satisfies the following condition:

$$1.50 < f_3/f_w < 4.20 \tag{13}$$

If a value of $f_3/f_w$ exceeds an upper limit of 4.20 in the condition (13), the power of the third lens unit excessively weakens, and the total length of the zoom lens system easily increases. When the focusing at the short distance is performed by the third lens unit, the movement amount increases. Therefore, it is difficult to realize a compact lens barrel. Further since a space for moving the third lens unit falls short, the photographing of a close object cannot sufficiently be performed. If the value lowers below a lower limit of 1.50, the power of the third lens unit excessively strengthens, the fluctuation of the astigmatism during the focusing easily increases, and a performance during the photographing of the object at the short distance deteriorates.

It is more preferable to satisfy the following condition:

$$1.70 < f_3/f_w < 3.50 \tag{13}'$$

In addition, it is further preferable to satisfy the following condition:

$$1.85 < f_3/f_w < 2.80 \tag{13}''$$

Moreover, it is preferable that the zoom lens system satisfies the following condition:

$$3.10 < L_w/f_w < 7.60 \tag{14}$$

in which $L_w$ is the total length of the zoom lens system in the wide-angle end, and $f_w$ is a focal length of the zoom lens system in the wide-angle end.

If a value of $L_w/f_w$ exceeds an upper limit of 7.60 in the condition (14), the total length excessively increases, and it is difficult to realize a compact lens barrel. If the value lowers below a lower limit of 3.10, the powers of the lens units constituting the lens system excessively strengthen, an amount of the aberration to be generated easily increases, and it is difficult to obtain a satisfactory optical performance.

It is more preferable to satisfy the following condition:

$$4.10 < L_w/f_w < 6.80 \tag{14}'$$

In addition, it is further preferable to satisfy the following condition:

$$5.10 < L_w/f_w < 6.10 \tag{14}''$$

Moreover, it is preferable that the zoom lens system satisfies the following condition:

$$0.60 < L_t/f_t < 3.00 \tag{15}$$

in which $L_t$ is the total length of the zoom lens system in the telephoto end, and $f_t$ is a focal length of the zoom lens system in the telephoto end.

If a value of $L_t/f_t$ exceeds an upper limit of 3.00 in the condition (15), the total length excessively increases, and it is difficult to realize a compact lens barrel. If the value lowers below a lower limit of 0.60, the powers of the lens units constituting the lens system excessively strengthen, the amount of the aberration to be generated easily increases, and it is difficult to obtain the satisfactory optical performance.

It is more preferable to satisfy the following condition:

$$1.00 < L_t/f_t < 2.50 \tag{15}'$$

In addition, it is further preferable to satisfy the following condition:

$$1.40 < L_t/f_t < 2.05 \quad (15)''.$$

An aperture stop may be disposed between the second lens unit and the third lens unit. According to such an arrangement, symmetry of the optical system before and after the aperture stop is improved. Therefore, aberrations such as the coma, the field curvature, the distortion and the chromatic aberration of magnification can further effectively be corrected.

Moreover, the aperture stop may be moved integrally with the second lens unit during the magnification change. In this case, since an entrance pupil can be constituted to be shallow, the constitution contributes to reduction of a diameter of the lens closest to the object side. Since the exit pupil can be disposed away from the image surface, the incidence angle upon the image surface can be reduced to allow the ray to efficiently enter the image sensor.

A positive or negative fourth lens unit may be disposed on the image side of the third lens unit. The field curvature or the distortion can further satisfactorily be corrected. The fourth lens unit may be moved independently of the other lens units during the magnification change. At this time, the lens units may be moved so that a space between the third lens unit and the fourth lens unit is larger in the telephoto end than in the wide-angle end. The chromatic aberration of magnification, the field curvature and the distortion can more effectively be corrected.

Moreover, it is preferable that the above zoom lens system satisfies the following condition:

$$5.0 < Fno_w \times L_w/f_w < 17.0 \quad (16),$$

in which $Fno_w$ is a full aperture F-value in the wide-angle end, $L_w$ is the total length of the zoom lens system in the wide-angle end, and $f_w$ is a focal length of the zoom lens system in the wide-angle end.

If a value of $Fno_w \times L_w/f_w$ exceeds an upper limit of 17.0 in the condition (16), the F-value or the total length unfavorably increases. If the value lowers below a lower limit of 5.0, the F-value or the total length excessively decreases. Therefore, the power of each lens unit strengthens, and an excessively large aberration is generated. In any case, it is difficult to secure a sufficient optical performance.

It is more preferable to satisfy the following condition:

$$7.0 < Fno_w \times L_w/f_w < 14.0 \quad (16)'.$$

In addition, it is further preferable to satisfy the following condition:

$$9.0 < Fno_w \times L_w/f_w < 11.0 \quad (16)''.$$

Among the above constitutions, a plurality of constitutions may arbitrarily be satisfied at the same time. In consequence, a more satisfactory effect can be obtained.

Moreover, if the conditions are arbitrarily combined and satisfied, a more satisfactory effect can be obtained.

It is to be noted that in Example 1 of the present invention described later, the first lens unit is constituted of a cemented lens including a negative lens and a positive lens in order from the object side. When the cemented lens is used, an axial air space between the lenses is removed, and a lens barrel is constituted to be compact when collapsed.

Next, Examples 1 to 7 of a zoom lens system of the present invention will be described. FIGS. 1A to 7C are sectional views of Examples 1 to 7 when focused on an infinite object. In the drawings, FIGS. 1A, 2A, . . . are sectional views in a wide-angle end, FIGS. 1B, 2B, . . . are sectional views in an intermediate state, and FIGS. 1C, 2C, . . . are sectional views in a telephoto end. In the drawings, a first lens unit is denoted with G1, a second lens unit is denoted with G2, an aperture stop is denoted with S, a third lens unit is denoted with G3, a fourth lens unit is denoted with G4, and an image surface is denoted with I. The reference symbol F denotes a parallel flat plate that includes a low pass filter or the like coated with an IR cut coating and the reference symbol C denotes a parallel flat plate which is a cover glass of an electronic image sensor (a CCD image sensor, a CMOS type image sensor or the like). A light receiving surface of the electronic image sensor is disposed at a position of the image surface I. It is to be noted that the surface of the cover glass C may be coated with a multilayered thin film for limiting a wavelength band. The cover glass C may have a low pass filter function.

Figure 1B:
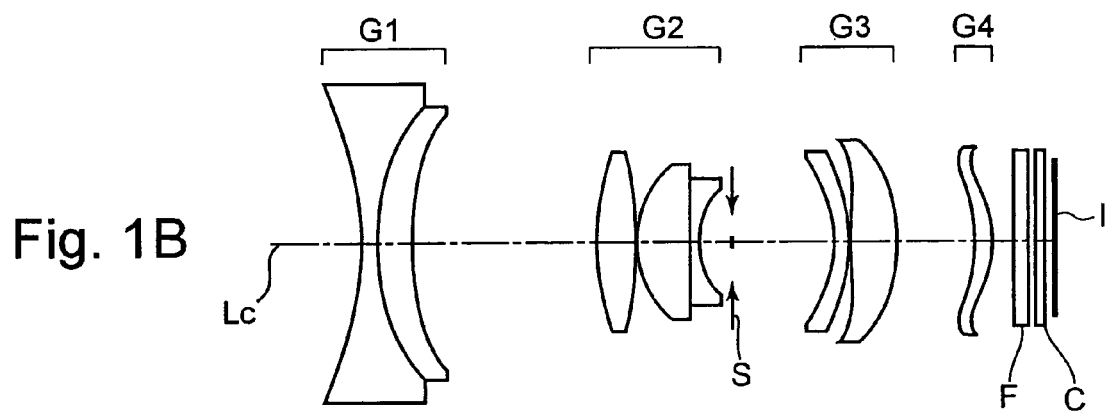
Figure 1C:
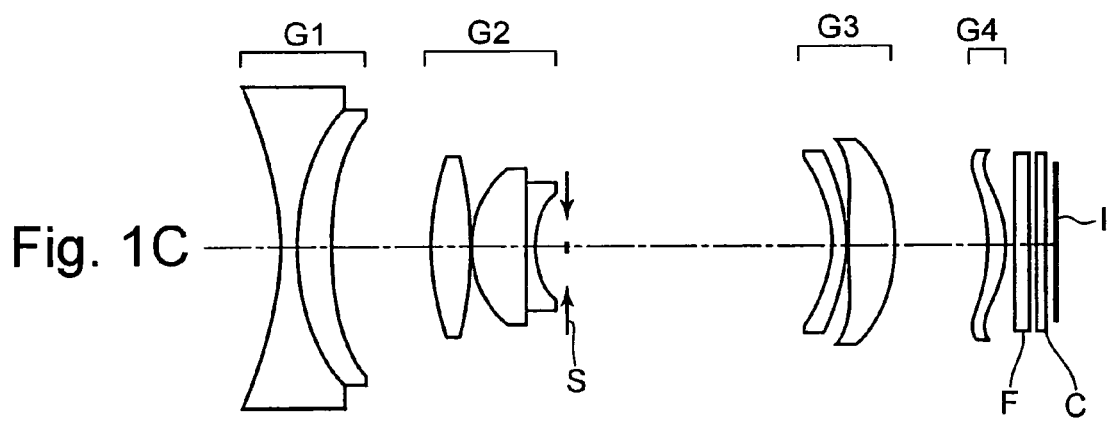

As shown in FIGS. 1A to 1C, a zoom lens system of Example 1 includes, in order from an object side, a first lens unit G1 having a negative refractive power, a second lens unit G2 having a positive refractive power, an aperture stop S, a third lens unit G3 having a positive refractive power and a fourth lens unit G4 having a positive refractive power. During magnification change from a wide-angle end to a telephoto end, the first lens unit G1 moves while drawing a locus being convex toward an image side, and is positioned slightly closer to the object side in the telephoto end than in the wide-angle end. The second lens unit G2 moves toward the object side integrally with the aperture stop S. The third lens unit G3 moves toward the object side while enlarging a space between the second lens unit G2 and the third lens unit. The fourth lens unit G4 moves toward the image side while enlarging a space between the third lens unit G3 and the fourth lens unit.

The first lens unit G1 is constituted of, in order from the object side, a double concave negative lens and a positive meniscus lens whose convex surface faces the object side. These lenses are cemented to form a cemented lens. The second lens unit G2 is constituted of, in order from the object side, a double convex positive lens, and a cemented lens of a positive meniscus lens whose convex surface faces the object side and a negative meniscus lens whose convex surface faces the object side. The third lens unit G3 is constituted of, in order from the object side, a negative meniscus lens whose convex surface faces the image side and a double convex positive lens. The fourth lens unit G4 is constituted of one positive meniscus lens whose convex surface faces the image side. The aperture stop S is positioned on the image side of the second lens unit G2.

Aspherical surfaces are used on nine surfaces including surfaces of the cemented lens of the first lens unit G1 closest to the object side and the image side, opposite surfaces of the double convex positive lens of the second lens unit G2, a surface of the cemented lens of the second lens unit G2 closest to the object side, opposite surfaces of the double convex positive lens of the third lens unit G3, and opposite surfaces of the positive meniscus lens of the fourth lens unit G4.

As shown in FIGS. 2A to 2C, a zoom lens system of Example 2 includes, in order from an object side, a first lens unit G1 having a negative refractive power, a second lens unit G2 having a positive refractive power, a third lens unit G3 having a positive refractive power and a fourth lens unit G4 having a positive refractive power. During magnification change from a wide-angle end to a telephoto end, the first lens unit G1 moves while drawing a locus being convex toward an image side, is positioned closer to the image side in the telephoto end than in the wide-angle end, and is positioned slightly closer to the object side in the telephoto end than in the intermediate state. The second lens unit G2 moves toward the object side integrally with an aperture stop S included in the second lens unit. The third lens unit G3 moves toward the object side while enlarging a space between the second lens unit G2 and the third lens unit. The fourth lens unit G4 moves toward the image side while enlarging a space between the third lens unit G3 and the fourth lens unit.

The first lens unit G1 is constituted of one double concave negative lens. The second lens unit G2 is constituted of, in order from the object side, a double convex positive lens, the aperture stop S and a cemented lens of a positive meniscus lens whose convex surface faces the object side and a negative meniscus lens whose convex surface faces the object side. The third lens unit G3 is constituted of, in order from the object side, a negative meniscus lens whose convex surface faces the image side and a double convex positive lens. The fourth lens unit G4 is constituted of one positive meniscus lens whose convex surface faces the object side. The aperture stop S is positioned between the double convex positive lens and the cemented lens of the second lens unit G2.

Aspherical surfaces are used on nine surfaces including opposite surfaces of the double concave negative lens of the first lens unit G1, opposite surfaces of the double convex positive lens of the second lens unit G2, a surface of the cemented lens of the second lens unit G2 closest to the image side, opposite surfaces of the double convex positive lens of the third lens unit G3, and opposite surfaces of the positive meniscus lens of the fourth lens unit G4.

As shown in FIGS. 3A to 3C, a zoom lens system of Example 3 includes, in order from an object side, a first lens unit G1 having a negative refractive power, a second lens unit G2 having a positive refractive power, a third lens unit G3 having a positive refractive power and a fourth lens unit G4 having a positive refractive power. During magnification change from a wide-angle end to a telephoto end, the first lens unit G1 moves while drawing a locus being convex toward an image side, and is positioned slightly closer to the image side in the telephoto end than in the wide-angle end. The second lens unit G2 moves toward the object side integrally with the aperture stop S. The third lens unit G3 moves while drawing a locus being convex toward the object side, and is positioned closer to the object side in the telephoto end than in the wide-angle end. The fourth lens unit G4 moves toward the image side while once enlarging a space between the third lens unit G3 and the fourth lens unit and then reducing the space.

The first lens unit G1 is constituted of one double concave negative lens. The second lens unit G2 is constituted of, in order from the object side, a double convex positive lens, and a cemented lens of a positive meniscus lens whose convex surface faces the object side and a negative meniscus lens whose convex surface faces the object side. The third lens unit G3 is constituted of, in order from the object side, a negative meniscus lens whose convex surface faces the image side and a double convex positive lens. The fourth lens unit G4 is constituted of one positive meniscus lens whose convex surface faces the image side. The aperture stop S is positioned on the image side of the second lens unit G2.

Aspherical surfaces are used on nine surfaces including opposite surfaces of the double concave negative lens of the first lens unit G1, opposite surfaces of the double convex positive lens of the second lens unit G2, a surface of the cemented lens of the second lens unit G2 closest to the image side, opposite surfaces of the double convex positive lens of the third lens unit G3, and opposite surfaces of the positive meniscus lens of the fourth lens unit G4.

Figure 4A:
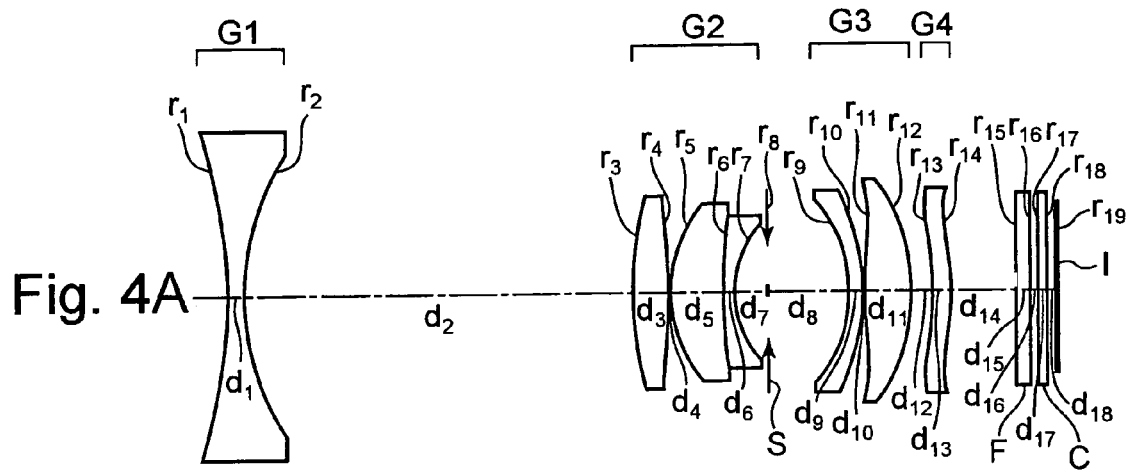
FIGS. 4A to 4C are sectional views of Example 4 of a zoom lens system according to the present invention when focused on an infinite object.
Figure 4B:
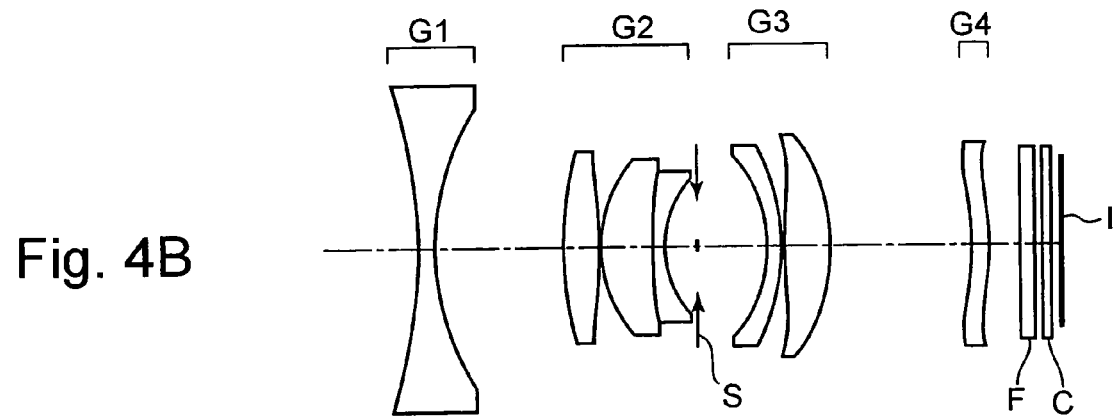
Figure 4C:
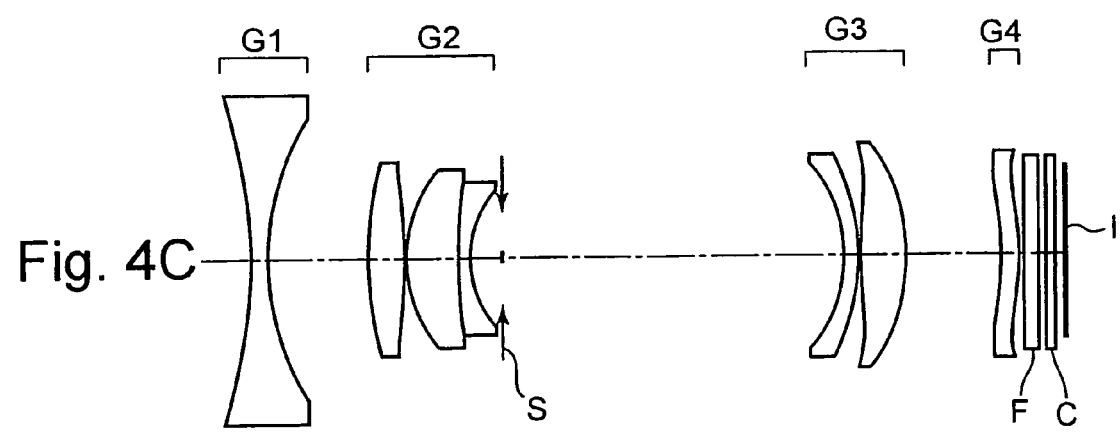

As shown in FIGS. 4A to 4C, a zoom lens system of Example 4 includes, in order from an object side, a first lens unit G1 having a negative refractive power, a second lens unit G2 having a positive refractive power, a third lens unit G3 having a positive refractive power and a fourth lens unit G4 having a positive refractive power. During magnification change from a wide-angle end to a telephoto end, the first lens unit G1 moves while drawing a locus being convex toward an image side, and is positioned slightly closer to the image side in the telephoto end than in the wide-angle end. The second lens unit G2 moves toward the object side integrally with an aperture stop S. The third lens unit G3 moves while drawing a locus being convex toward the object side, and is positioned closer to the object side in the telephoto end than in the wide-angle end. The fourth lens unit G4 moves toward the image side while once enlarging a space between the third lens unit G3 and the fourth lens unit and then reducing the space.

The first lens unit G1 is constituted of one double concave negative lens. The second lens unit G2 is constituted of, in order from the object side, a double convex positive lens, and a cemented lens of a positive meniscus lens whose convex surface faces the object side and a negative meniscus lens whose convex surface faces the object side. The third lens unit G3 is constituted of, in order from the object side, a negative meniscus lens whose convex surface faces the image side and a double convex positive lens. The fourth lens unit G4 is constituted of one positive meniscus lens whose convex surface faces the image side. The aperture stop S is positioned on the image side of the second lens unit G2.

Aspherical surfaces are used on nine surfaces including opposite surfaces of the double concave negative lens of the first lens unit G1, opposite surfaces of the double convex positive lens of the second lens unit G2, a surface of the cemented lens of the second lens unit G2 closest to the object side, opposite surfaces of the double convex positive lens of the third lens unit G3, and opposite surfaces of the positive meniscus lens of the fourth lens unit G4.

Figure 5A:
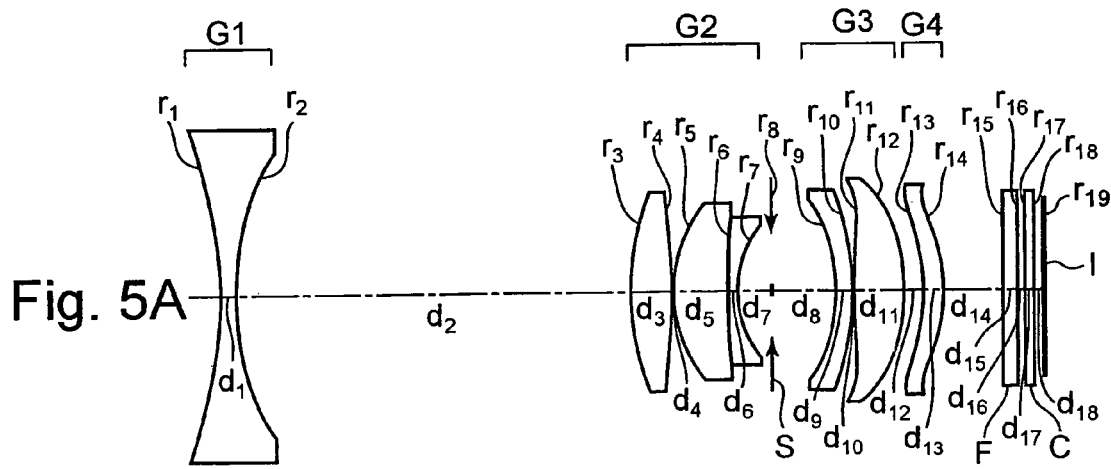
FIGS. 5A to 5C are sectional views of Example 5 of a zoom lens system according to the present invention when focused on an infinite object.
Figure 5B:
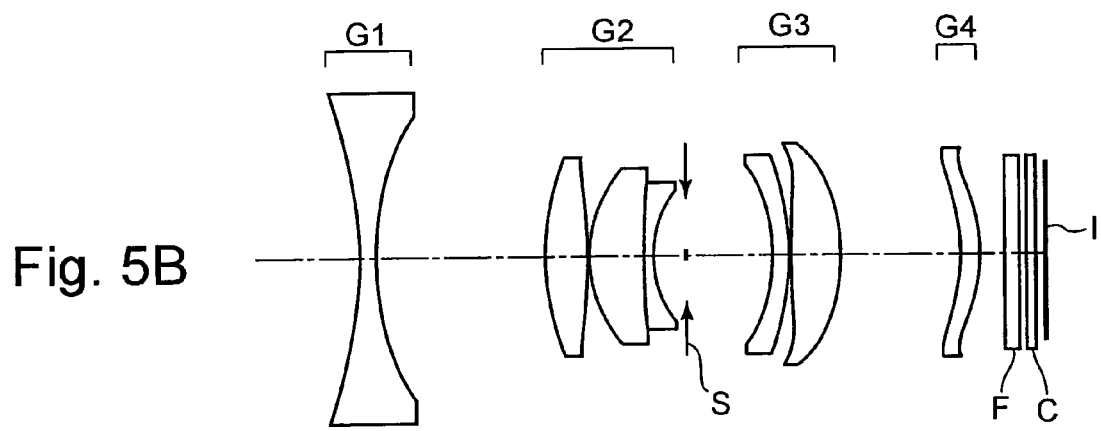
Figure 5C:
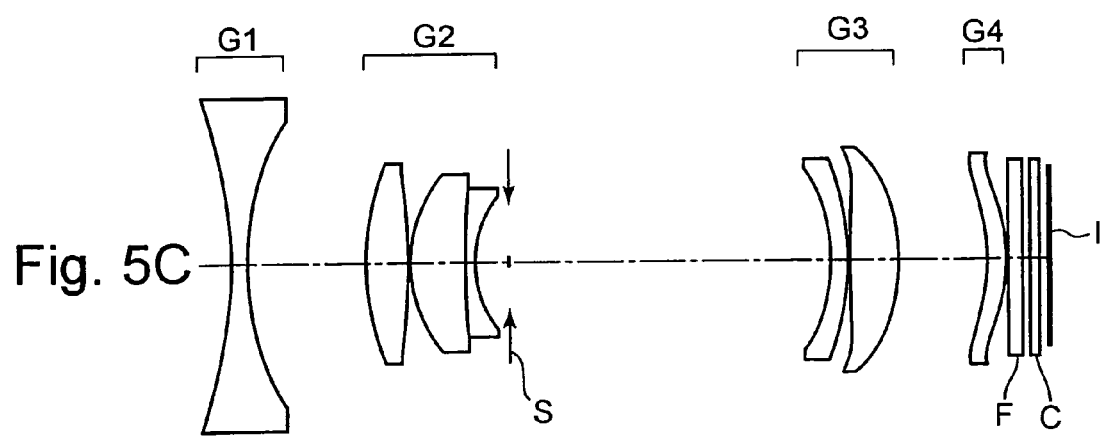

As shown in FIGS. 5A to 5C, a zoom lens system of Example 5 includes, in order from an object side, a first lens unit G1 having a negative refractive power, a second lens unit G2 having a positive refractive power, a third lens unit G3 having a positive refractive power and a fourth lens unit G4 having a positive refractive power. During magnification change from a wide-angle end to a telephoto end, the first lens unit G1 moves while drawing a locus being convex toward an image side, and is positioned slightly closer to the image side in the telephoto end than in the wide-angle end. The second lens unit G2 moves toward the object side integrally with the aperture stop S. The third lens unit G3 moves while drawing a locus being convex toward the object side, and is positioned closer to the object side in the telephoto end than in the wide-angle. The fourth lens unit G4 moves toward the image side while once enlarging a space between the third lens unit G3 and the fourth lens unit and then reducing the space.

The first lens unit G1 is constituted of one double concave negative lens. The second lens unit G2 is constituted of, in order from the object side, a double convex positive lens, and a cemented lens of a positive meniscus lens whose convex surface faces the object side and a negative meniscus lens whose convex surface faces the object side. The third lens unit G3 is constituted of, in order from the object side, a negative meniscus lens whose convex surface faces the image side and a double convex positive lens. The fourth lens unit G4 is constituted of one positive meniscus lens whose convex surface faces the image side. The aperture stop S is positioned on the image side of the second lens unit G2.

Aspherical surfaces are used on nine surfaces including opposite surfaces of the double concave negative lens of the first lens unit G1, opposite surfaces of the double convex positive lens of the second lens unit G2, a surface of the cemented lens of the second lens unit G2 closest to the object side, opposite surfaces of the double convex positive lens of the third lens unit G3, and opposite surfaces of the positive meniscus lens of the fourth lens unit G4.

As shown in FIGS. 6A to 6C, a zoom lens system of Example 6 includes, in order from an object side, a first lens unit G1 having a negative refractive power, a second lens unit G2 having a positive refractive power, a third lens unit G3 having a positive refractive power and a fourth lens unit G4 having a positive refractive power. During magnification change from a wide-angle end to a telephoto end, the first lens unit G1 moves while drawing a locus being convex toward an image side, and is positioned slightly closer to the image side in the telephoto end than in the wide-angle end. The second lens unit G2 moves toward the object side integrally with an aperture stop S. The third lens unit G3 moves while drawing a locus being convex toward the object side, and is positioned closer to the object side in the telephoto end than in the wide-angle end. The fourth lens unit G4 moves toward the image side while once enlarging a space between the third lens unit G3 and the fourth lens unit and then reducing the space.

The first lens unit G1 is constituted of one double concave negative lens. The second lens unit G2 is constituted of, in order from the object side, a double convex positive lens, and a cemented lens of a positive meniscus lens whose convex surface faces the object side and a negative meniscus lens whose convex surface faces the object side. The third lens unit G3 is constituted of, in order from the object side, a negative meniscus lens whose convex surface faces the image side and a double convex positive lens. The fourth lens unit G4 is constituted of one positive meniscus lens whose convex surface faces the image side. The aperture stop S is positioned on the image side of the second lens unit G2.

Aspherical surfaces are used on nine surfaces including opposite surfaces of the double concave negative lens of the first lens unit G1, opposite surfaces of the double convex positive lens of the second lens unit G2, a surface of the cemented lens of the second lens unit G2 closest to the object side, opposite surfaces of the double convex positive lens of the third lens unit G3, and opposite surfaces of the positive meniscus lens of the fourth lens unit G4.

Figure 7A:
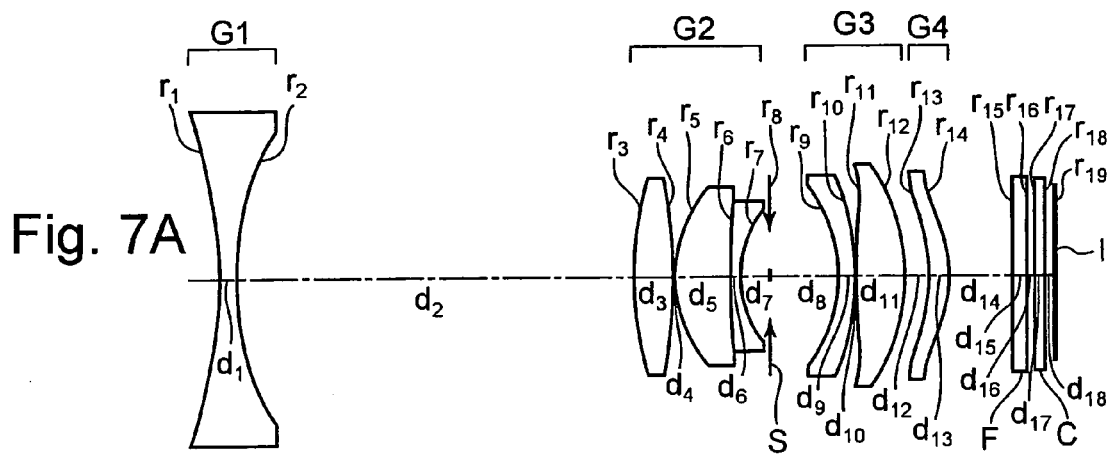
FIGS. 7A to 7C are sectional views of Example 7 of a zoom lens system according to the present invention when focused on an infinite object.
Figure 7B:
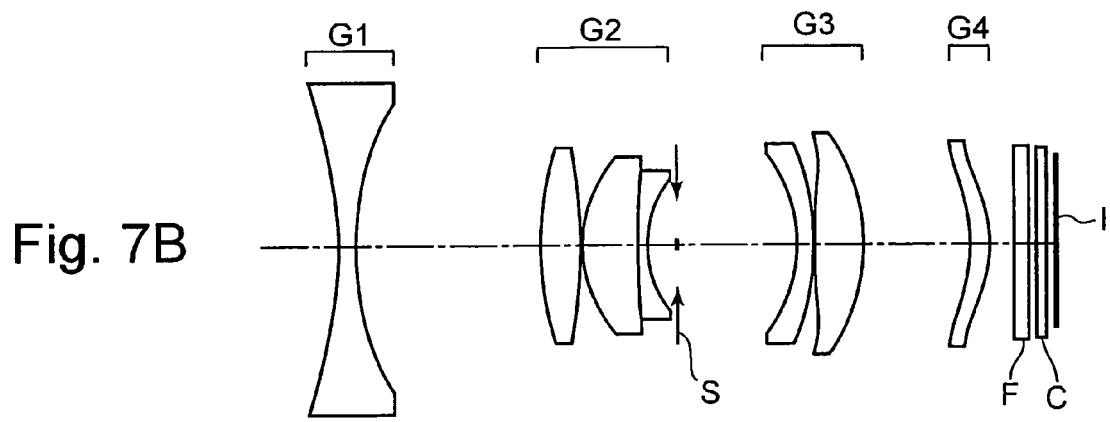
Figure 7C:
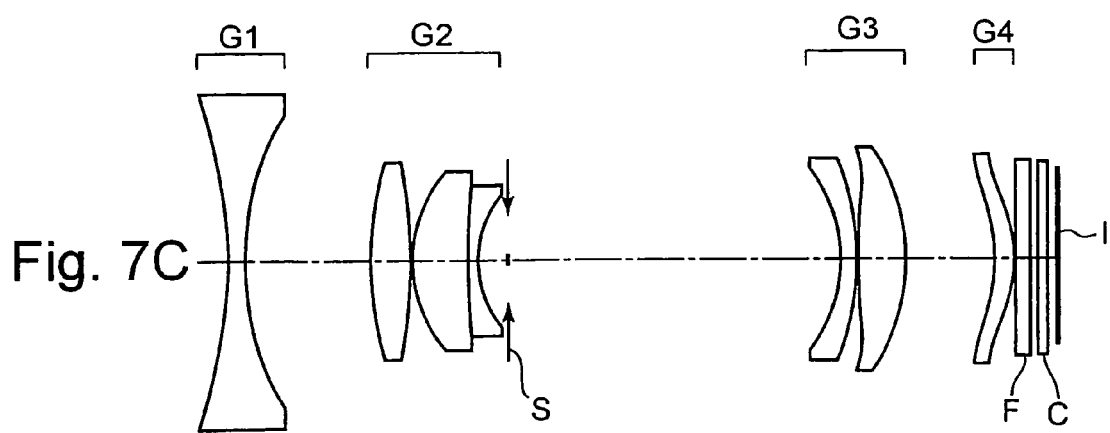

As shown in FIGS. 7A to 7C, a zoom lens system of Example 7 includes, in order from an object side, a first lens unit G1 having a negative refractive power, a second lens unit G2 having a positive refractive power, a third lens unit G3 having a positive refractive power and a fourth lens unit G4 having a positive refractive power. During magnification change from a wide-angle end to a telephoto end, the first lens unit G1 moves while drawing a locus being convex toward an image side, and is positioned slightly closer to the image side in the telephoto end than in the wide-angle end. The second lens unit G2 moves toward the object side integrally with an aperture stop S. The third lens unit G3 moves while drawing a locus being convex toward the object side, and is positioned slightly closer to the object side in the telephoto end than in the wide-angle end. The fourth lens unit G4 moves toward the image side while once enlarging a space between the third lens unit G3 and the fourth lens unit and then reducing the space.

The first lens unit G1 is constituted of one double concave negative lens. The second lens unit G2 is constituted of, in order from the object side, a double convex positive lens, and a cemented lens of a positive meniscus lens whose convex surface faces the object side and a negative meniscus lens whose convex surface faces the object side. The third lens unit G3 is constituted of, in order from the object side, a negative meniscus lens whose convex surface faces the image side and a double convex positive lens. The fourth lens unit G4 is constituted of one positive meniscus lens whose convex surface faces the image side. The aperture stop S is positioned on the image side of the second lens unit G2.

Aspherical surfaces are used on nine surfaces including opposite surfaces of the double concave negative lens of the first lens unit G1, opposite surfaces of the double convex positive lens of the second lens unit G2, a surface of the cemented lens of the second lens unit G2 closest to the object side, opposite surfaces of the double convex positive lens of the third lens unit G3, and opposite surfaces of the positive meniscus lens of the fourth lens unit G4.

Numerical data of the above examples will hereinafter be described. In addition to the above symbols, f is a focal length of the zoom lens system; $F_{NO}$ is the F-number; $2\omega$ is an angle of field; WE is a wide-angle end; ST is an intermediate state; TE is a telephoto end; $r_1, r_2 \ldots$ are radii of curvatures of lens surfaces; $d_1, d_2 \ldots$ are spaces between the lens surfaces; $n_{d1}, n_{d2} \ldots$ are refractive indices of the lenses for the d-line; and $v_{d1}, v_{d2} \ldots$ are the Abbe numbers of the lenses. A symbol * attached to data of the radius of curvature indicates that the surface is an aspherical surface, symbol (S) indicates that the surface is an aperture stop, and symbol (I) indicates an image surface.

It is to be noted that a shape of the aspherical surface is represented by the following equation in a coordinate system in which an intersection between the optical axis and the aspherical surface is an origin, a z-axis is an optical axis in which a light travel direction is set to be positive, and a y-axis is an axis of an arbitrary direction crossing the optical axis at right angle and passing the origin:

$$z=(y^2/r)/([1+\{1-(K+1)(y/r)^2\}^{1/2}]+A_4 y^4+A_6 y^6+A_8 y^8+A_{10} y^{10},$$

in which r is a paraxial radius of curvature, K is a conic constant, and $A_4, A_6, A_8$ and $A_{10}$ are 4-th, 6-th, 8-th and 10-th order aspherical coefficients.

Example 1

| | | | |
|---|---|---|---|
| $r_1 = -18.164$* | $d_1 = 0.90$ | $n_{d1} = 1.51633$ | $v_{d1} = 64.14$ |
| $r_2 = 13.285$ | $d_2 = 1.80$ | $n_{d2} = 1.83918$ | $v_{d2} = 23.85$ |
| $r_3 = 17.066$* | $d_3 =$ variable | | |
| $r_4 = 13.962$* | $d_4 = 2.20$ | $n_{d3} = 1.74320$ | $v_{d3} = 49.34$ |
| $r_5 = -25.345$* | $d_5 = 0.10$ | | |
| $r_6 = 6.022$* | $d_6 = 2.89$ | $n_{d4} = 1.80610$ | $v_{d4} = 40.92$ |
| $r_7 = 119.085$ | $d_7 = 0.50$ | $n_{d5} = 2.00069$ | $v_{d5} = 25.46$ |
| $r_8 = 4.353$ | $d_8 = 1.72$ | | |
| $r_9 = \infty$ (S) | $d_9 =$ variable | | |
| $r_{10} = -8.900$ | $d_{10} = 0.80$ | $n_{d6} = 1.92286$ | $v_{d6} = 18.90$ |
| $r_{11} = -12.685$ | $d_{11} = 0.18$ | | |
| $r_{12} = 64.569$* | $d_{12} = 2.55$ | $n_{d7} = 1.80610$ | $v_{d7} = 40.92$ |
| $r_{13} = -13.461$* | $d_{13} =$ variable | | |
| $r_{14} = -11.384$* | $d_{14} = 1.00$ | $n_{d8} = 1.52542$ | $v_{d8} = 55.78$ |
| $r_{15} = -6.418$* | $d_{15} =$ variable | | |
| $r_{16} = \infty$ | $d_{16} = 0.74$ | $n_{d9} = 1.54771$ | $v_{d9} = 62.84$ |
| $r_{17} = \infty$ | $d_{17} = 0.50$ | | |
| $r_{18} = \infty$ | $d_{18} = 0.50$ | $n_{d10} = 1.51633$ | $v_{d10} = 64.14$ |
| $r_{19} = \infty$ | $d_{19} = 0.55$ | | |
| $r_{20} = \infty$ (I) | | | |

TABLE 1-1

Aspherical coefficient

| | 1st surface | 3rd surface | 4th surface | 5th surface | 6th surface |
|---|---|---|---|---|---|
| K | −0.690 | −2.051 | −0.478 | −8.737 | 0.224 |
| $A_4$ | $1.00171 \times 10^{-4}$ | $8.63337 \times 10^{-5}$ | $-1.21096 \times 10^{-4}$ | $-3.31436 \times 10^{-5}$ | $-2.71845 \times 10^{-5}$ |
| $A_6$ | $-1.63342 \times 10^{-7}$ | $-3.14892 \times 10^{-8}$ | $2.15656 \times 10^{-6}$ | $-1.24138 \times 10^{-6}$ | $-6.16672 \times 10^{-6}$ |
| $A_8$ | 0.000 | $7.47008 \times 10^{-9}$ | $-1.23897 \times 10^{-7}$ | $-6.21293 \times 10^{-9}$ | $1.14404 \times 10^{-7}$ |
| $A_{10}$ | $2.47553 \times 10^{-12}$ | 0.000 | $1.80977 \times 10^{-9}$ | $5.65326 \times 10^{-10}$ | $-6.55772 \times 10^{-9}$ |

TABLE 1-2

| | 12th surface | 13th surface | 14th surface | 15th surface |
|---|---|---|---|---|
| K | −511.997 | 0.910 | −0.773 | 0.000 |
| $A_4$ | $-1.35640 \times 10^{-4}$ | $-1.71590 \times 10^{-4}$ | $-1.36202 \times 10^{-3}$ | 0.000 |
| $A_6$ | $-9.45635 \times 10^{-6}$ | $-7.55572 \times 10^{-6}$ | $7.62379 \times 10^{-5}$ | $7.95903 \times 10^{-5}$ |
| $A_8$ | $-1.55393 \times 10^{-7}$ | $-1.11729 \times 10^{-8}$ | 0.000 | $1.49209 \times 10^{-7}$ |
| $A_{10}$ | 0.000 | $-1.29134 \times 10^{-9}$ | 0.000 | 0.000 |

TABLE 2

Zoom Data (∞)

| | WE | ST | TE |
|---|---|---|---|
| f (mm) | 7.32 | 12.40 | 20.95 |
| $F_{NO}$ | 1.86 | 2.57 | 3.86 |
| 2ω(°) | 66.55 | 39.00 | 23.69 |
| $d_3$ | 19.41 | 10.28 | 5.74 |
| $d_9$ | 2.74 | 5.59 | 14.38 |
| $d_{13}$ | 1.12 | 4.30 | 5.22 |
| $d_{15}$ | 2.42 | 1.20 | 0.54 |

Example 2

| | | | |
|---|---|---|---|
| $r_1 = -20.816$* | $d_1 = 0.90$ | $n_{d1} = 1.43875$ | $v_{d1} = 94.93$ |
| $r_2 = 25.057$* | $d_2$ = variable | | |
| $r_3 = 37.240$* | $d_3 = 1.66$ | $n_{d2} = 1.69350$ | $v_{d2} = 53.20$ |
| $r_4 = -20.795$* | $d_4 = 0.85$ | | |
| $r_5 = \infty$ (S) | $d_5 = 0.00$ | | |
| $r_6 = 6.489$ | $d_6 = 2.89$ | $n_{d3} = 1.88300$ | $v_{d3} = 40.76$ |
| $r_7 = 18.770$ | $d_7 = 0.55$ | $n_{d4} = 1.83918$ | $v_{d4} = 23.85$ |
| $r_8 = 4.726$* | $d_8$ = variable | | |
| $r_9 = -7.273$ | $d_9 = 0.80$ | $n_{d5} = 1.92286$ | $v_{d5} = 18.90$ |
| $r_{10} = -10.260$ | $d_{10} = 0.14$ | | |
| $r_{11} = 73.301$* | $d_{11} = 2.89$ | $n_{d6} = 1.69350$ | $v_{d6} = 53.20$ |
| $r_{12} = -8.705$* | $d_{12}$ = variable | | |
| $r_{13} = 51.991$* | $d_{13} = 1.00$ | $n_{d7} = 1.69350$ | $v_{d7} = 53.20$ |
| $r_{14} = 82.598$* | $d_{14}$ = variable | | |
| $r_{15} = \infty$ | $d_{15} = 0.74$ | $n_{d8} = 1.54771$ | $v_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $v_{d9} = 64.14$ |
| $r_{18} = \infty$ | $d_{18} = 0.55$ | | |
| $r_{19} = \infty$ (I) | | | |

TABLE 3-1

Aspherical coefficient

| | 1st surface | 2nd surface | 3rd surface | 4th surface | 8th surface |
|---|---|---|---|---|---|
| K | 1.180 | −1.851 | 0.345 | −19.177 | 0.046 |
| $A_4$ | $1.40655 \times 10^{-4}$ | $7.57636 \times 10^{-5}$ | $-1.00415 \times 10^{-4}$ | $-2.82138 \times 10^{-4}$ | $-7.00739 \times 10^{-5}$ |
| $A_6$ | $-1.80459 \times 10^{-7}$ | $8.16426 \times 10^{-7}$ | $9.13285 \times 10^{-7}$ | $6.17656 \times 10^{-6}$ | $-7.43442 \times 10^{-8}$ |
| $A_8$ | 0.000 | $-3.52579 \times 10^{-9}$ | $-5.30604 \times 10^{-8}$ | $-2.15982 \times 10^{-7}$ | $3.15359 \times 10^{-8}$ |
| $A_{10}$ | 0.000 | 0.000 | $-1.70089 \times 10^{-9}$ | $1.04026 \times 10^{-9}$ | $2.80403 \times 10^{-8}$ |

TABLE 3-2

| | 11th surface | 12th surface | 13th surface | 14th surface |
|---|---|---|---|---|
| K | 9.900 | 0.071 | −3.830 | 0.000 |
| $A_4$ | $-1.65424 \times 10^{-4}$ | $1.40802 \times 10^{-4}$ | $-1.61854 \times 10^{-4}$ | 0.000 |
| $A_6$ | $-2.62280 \times 10^{-6}$ | $-1.28528 \times 10^{-6}$ | $-4.23404 \times 10^{-6}$ | 0.000 |
| $A_8$ | 0.000 | 0.000 | 0.000 | $-1.27169 \times 10^{-7}$ |
| $A_{10}$ | 0.000 | 0.000 | 0.000 | 0.000 |

TABLE 4

Zoom Data (∞)

|  | WE | ST | TE |
|---|---|---|---|
| f (mm) | 8.14 | 13.53 | 23.43 |
| $F_{NO}$ | 1.85 | 2.44 | 3.48 |
| 2ω(°) | 61.93 | 35.96 | 21.05 |
| $d_2$ | 21.66 | 11.45 | 4.17 |
| $d_8$ | 4.72 | 10.20 | 18.25 |
| $d_{12}$ | 0.90 | 1.21 | 2.48 |
| $d_{14}$ | 3.14 | 2.14 | 0.33 |

TABLE 6

Zoom Data (∞)

|  | WE | ST | TE |
|---|---|---|---|
| f (mm) | 8.14 | 14.00 | 23.40 |
| $F_{NO}$ | 1.86 | 2.31 | 3.68 |
| 2ω(°) | 60.88 | 35.28 | 21.40 |
| $d_2$ | 20.49 | 6.87 | 5.23 |
| $d_8$ | 4.12 | 3.63 | 17.92 |
| $d_{11}$ | 1.11 | 7.40 | 5.08 |
| $d_{14}$ | 3.45 | 1.58 | 0.10 |

Example 3

| | | | |
|---|---|---|---|
| $r_1 = -28.621*$ | $d_1 = 0.90$ | $n_{d1} = 1.43875$ | $v_{d1} = 94.93$ |
| $r_2 = 13.270*$ | $d_2 =$ variable | | |
| $r_3 = 18.910*$ | $d_3 = 1.83$ | $n_{d2} = 1.76802$ | $v_{d2} = 49.24$ |
| $r_4 = -52.548*$ | $d_4 = 0.10$ | | |
| $r_5 = 7.084$ | $d_5 = 2.89$ | $n_{d3} = 1.88300$ | $v_{d3} = 40.76$ |
| $r_6 = 27.980$ | $d_6 = 0.55$ | $n_{d4} = 1.83918$ | $v_{d4} = 23.85$ |
| $r_7 = 5.338*$ | $d_7 = 1.72$ | | |
| $r_8 = \infty$ (S) | $d_8 =$ variable | | |
| $r_9 = -7.790$ | $d_9 = 0.80$ | $n_{d5} = 1.92286$ | $v_{d5} = 18.90$ |
| $r_{10} = -11.396$ | $d_{10} = 0.15$ | | |
| $r_{11} = 60.657*$ | $d_{11} = 2.34$ | $n_{d6} = 1.76802$ | $v_{d6} = 49.24$ |
| $r_{12} = -11.972*$ | $d_{12} =$ variable | | |
| $r_{13} = -26.874*$ | $d_{13} = 1.00$ | $n_{d7} = 1.69350$ | $v_{d7} = 53.20$ |
| $r_{14} = -17.612*$ | $d_{14} =$ variable | | |
| $r_{15} = \infty$ | $d_{15} = 0.74$ | $n_{d8} = 1.54771$ | $v_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $v_{d9} = 64.14$ |
| $r_{18} = \infty$ | $d_{18} = 0.55$ | | |
| $r_{19} = \infty$ (I) | | | |

Example 4

| | | | |
|---|---|---|---|
| $r_1 = -22.456*$ | $d_1 = 0.90$ | $n_{d1} = 1.43875$ | $v_{d1} = 94.93$ |
| $r_2 = 14.994*$ | $d_2 =$ variable | | |
| $r_3 = 13.771*$ | $d_3 = 2.19$ | $n_{d2} = 1.76802$ | $v_{d2} = 49.24$ |
| $r_4 = -39.652*$ | $d_4 = 0.10$ | | |
| $r_5 = 6.603*$ | $d_5 = 2.89$ | $n_{d3} = 1.80610$ | $v_{d3} = 40.92$ |
| $r_6 = 36.989$ | $d_6 = 0.50$ | $n_{d4} = 2.00069$ | $v_{d4} = 25.46$ |
| $r_7 = 4.970$ | $d_7 = 1.72$ | | |
| $r_8 = \infty$ (S) | $d_8 =$ variable | | |
| $r_9 = -8.900$ | $d_9 = 0.80$ | $n_{d5} = 1.92286$ | $v_{d5} = 18.90$ |
| $r_{10} = -16.301$ | $d_{10} = 0.18$ | | |
| $r_{11} = 45.839*$ | $d_{11} = 2.55$ | $n_{d6} = 1.80610$ | $v_{d6} = 40.92$ |
| $r_{12} = -11.204*$ | $d_{12} =$ variable | | |
| $r_{13} = -11.989*$ | $d_{13} = 1.00$ | $n_{d7} = 1.52542$ | $v_{d7} = 55.78$ |
| $r_{14} = -8.434*$ | $d_{14} =$ variable | | |
| $r_{15} = \infty$ | $d_{15} = 0.74$ | $n_{d8} = 1.54771$ | $v_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $v_{d9} = 64.14$ |
| $r_{18} = \infty$ | $d_{18} = 0.36$ | | |
| $r_{19} = \infty$ (I) | | | |

TABLE 5-1

Aspherical coefficient

| | 1st surface | 2nd surface | 3rd surface | 4th surface | 7th surface |
|---|---|---|---|---|---|
| K | −0.134 | −1.454 | −0.093 | −18.402 | 0.004 |
| $A_4$ | $2.47196 \times 10^{-7}$ | $1.35646 \times 10^{-5}$ | $3.65504 \times 10^{-5}$ | $3.23935 \times 10^{-5}$ | $1.46877 \times 10^{-4}$ |
| $A_6$ | $2.34297 \times 10^{-7}$ | $-1.44746 \times 10^{-7}$ | $-1.10311 \times 10^{-7}$ | $-6.55955 \times 10^{-7}$ | $8.79444 \times 10^{-6}$ |
| $A_8$ | 0.000 | $6.88829 \times 10^{-9}$ | $-4.25458 \times 10^{-8}$ | $-3.93067 \times 10^{-8}$ | $1.86813 \times 10^{-7}$ |
| $A_{10}$ | 0.000 | 0.000 | $2.18338 \times 10^{-10}$ | $4.20213 \times 10^{-10}$ | $8.06203 \times 10^{-9}$ |

TABLE 5-2

| | 11th surface | 12th surface | 13th surface | 14th surface |
|---|---|---|---|---|
| K | −12.098 | −0.296 | −5.302 | 0.000 |
| $A_4$ | $-1.37660 \times 10^{-4}$ | $-5.40491 \times 10^{-5}$ | $-3.55522 \times 10^{-4}$ | 0.000 |
| $A_6$ | $1.15212 \times 10^{-6}$ | $-2.16122 \times 10^{-6}$ | $2.30162 \times 10^{-5}$ | $2.63358 \times 10^{-5}$ |
| $A_8$ | $-2.15963 \times 10^{-7}$ | $-3.79109 \times 10^{-8}$ | 0.000 | $1.38995 \times 10^{-8}$ |
| $A_{10}$ | 0.000 | $-2.42168 \times 10^{-9}$ | 0.000 | 0.000 |

TABLE 7-1

Aspherical coefficient

|  | 1st surface | 2nd surface | 3rd surface | 4th surface | 5th surface |
|---|---|---|---|---|---|
| K | −0.459 | −1.934 | −0.157 | −17.823 | 0.201 |
| $A_4$ | $2.33118 \times 10^{-5}$ | $3.16423 \times 10^{-5}$ | $1.98169 \times 10^{-5}$ | $-1.06473 \times 10^{-5}$ | $-1.48728 \times 10^{-4}$ |
| $A_6$ | $2.15920 \times 10^{-7}$ | $-2.27645 \times 10^{-7}$ | $-2.11464 \times 10^{-6}$ | $-3.59679 \times 10^{-6}$ | $-4.66395 \times 10^{-6}$ |
| $A_8$ | 0.000 | $1.23376 \times 10^{-8}$ | $-7.88182 \times 10^{-8}$ | $3.36460 \times 10^{-8}$ | $1.36528 \times 10^{-8}$ |
| $A_{10}$ | $5.54144 \times 10^{-13}$ | 0.000 | $1.28470 \times 10^{-9}$ | $1.43653 \times 10^{-10}$ | $-1.08445 \times 10^{-9}$ |

TABLE 7-2

|  | 11th surface | 12th surface | 13th surface | 14th surface |
|---|---|---|---|---|
| K | −11.706 | −0.766 | −3.556 | 0.000 |
| $A_4$ | $-1.64483 \times 10^{-4}$ | $-6.30426 \times 10^{-5}$ | $-1.01455 \times 10^{-3}$ | 0.000 |
| $A_6$ | $-2.88572 \times 10^{-6}$ | $-6.34815 \times 10^{-6}$ | $5.08647 \times 10^{-5}$ | $4.24264 \times 10^{-5}$ |
| $A_8$ | $-2.78723 \times 10^{-7}$ | $-5.34397 \times 10^{-8}$ | 0.000 | $2.17708 \times 10^{-7}$ |
| $A_{10}$ | 0.000 | $-2.91352 \times 10^{-9}$ | 0.000 | 0.000 |

TABLE 8

Zoom Data (∞)

|  | WE | ST | TE |
|---|---|---|---|
| f (mm) | 8.14 | 13.86 | 23.36 |
| $F_{NO}$ | 1.86 | 2.41 | 3.84 |
| 2ω(°) | 60.97 | 35.69 | 21.53 |
| $d_2$ | 20.73 | 8.61 | 6.38 |
| $d_8$ | 3.43 | 4.36 | 17.08 |
| $d_{12}$ | 1.29 | 6.78 | 4.89 |
| $d_{14}$ | 3.26 | 1.29 | 0.09 |

Example 5

| | | | |
|---|---|---|---|
| $r_1 = -22.732*$ | $d_1 = 0.90$ | $n_{d1} = 1.43875$ | $v_{d1} = 94.93$ |
| $r_2 = 14.930*$ | $d_2 = $ variable | | |
| $r_3 = 13.675*$ | $d_3 = 2.22$ | $n_{d2} = 1.74320$ | $v_{d2} = 49.34$ |
| $r_4 = -35.635*$ | $d_4 = 0.10$ | | |
| $r_5$ 6.567* | $d_5 = 2.89$ | $n_{d3} = 1.80610$ | $v_{d3} = 40.92$ |
| $r_6 = 36.857$ | $d_6 = 0.50$ | | |
| $r_7 = 4.934$ | $d_7 = 1.72$ | $n_{d4} = 2.00069$ | $v_{d4} = 25.46$ |
| $r_8 = \infty$ (S) | $d_8 = $ variable | | |
| $r_9 = -8.940$ | $d_9 = 0.80$ | $n_{d5} = 1.92286$ | $v_{d5} = 18.90$ |
| $r_{10} = -16.369$ | $d_{10} = 0.18$ | | |
| $r_{11} = 45.839*$ | $d_{11} = 2.55$ | $n_{d6} = 1.80610$ | $v_{d6} = 40.92$ |
| $r_{12} = -11.200*$ | $d_{12} = $ variable | | |
| $r_{13} = -10.490*$ | $d_{13} = 1.00$ | $n_{d7} = 1.52542$ | $v_{d7} = 55.78$ |
| $r_{14} = -7.694*$ | $d_{14} = $ variable | | |
| $r_{15} = \infty$ | $d_{15} = 0.74$ | $n_{d8} = 1.54771$ | $v_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $v_{d9} = 64.14$ |
| $r_{18} = \infty$ | $d_{18} = 0.49$ | | |
| $r_{19} = \infty$ (I) | | | |

TABLE 9-1

Aspherical coefficient

|  | 1st surface | 2nd surface | 3rd surface | 4th surface | 5th surface |
|---|---|---|---|---|---|
| K | −0.515 | −2.154 | −0.175 | −17.795 | 0.190 |
| $A_4$ | $3.92602 \times 10^{-5}$ | $5.13992 \times 10^{-5}$ | $-7.40812 \times 10^{-6}$ | $-1.27019 \times 10^{-5}$ | $-1.08305 \times 10^{-4}$ |
| $A_6$ | $-1.48623 \times 10^{-8}$ | $-9.41584 \times 10^{-8}$ | $-3.56080 \times 10^{-7}$ | $-4.94424 \times 10^{-7}$ | $-2.85168 \times 10^{-6}$ |
| $A_8$ | 0.000 | $5.04242 \times 10^{-9}$ | $-2.19131 \times 10^{-8}$ | $-7.21058 \times 10^{-9}$ | $-4.27801 \times 10^{-8}$ |
| $A_{10}$ | $1.85395 \times 10^{-12}$ | 0.000 | $-7.65694 \times 10^{-11}$ | $-1.04401 \times 10^{-11}$ | $-1.92590 \times 10^{-9}$ |

TABLE 9-2

|  | 11th surface | 12th surface | 13th surface | 14th surface |
|---|---|---|---|---|
| K | −11.837 | −0.838 | −2.977 | 0.000 |
| $A_4$ | $-1.75086 \times 10^{-4}$ | $-6.93379 \times 10^{-5}$ | $-1.09868 \times 10^{-3}$ | 0.000 |
| $A_6$ | $-2.27012 \times 10^{-6}$ | $-6.51775 \times 10^{-6}$ | $5.00073 \times 10^{-5}$ | $4.46816 \times 10^{-5}$ |
| $A_8$ | $-3.09026 \times 10^{-7}$ | $-5.91578 \times 10^{-8}$ | 0.000 | $1.02875 \times 10^{-7}$ |
| $A_{10}$ | 0.000 | $-3.02570 \times 10^{-9}$ | 0.000 | 0.000 |

TABLE 10

Zoom Data (∞)

|       | WE    | ST    | TE    |
|-------|-------|-------|-------|
| f (mm)    | 8.14  | 13.82 | 23.36 |
| $F_{NO}$  | 1.86  | 2.42  | 3.85  |
| 2ω(°)     | 60.80 | 35.73 | 21.46 |
| $d_2$     | 20.73 | 8.82  | 6.35  |
| $d_8$     | 3.37  | 4.61  | 17.03 |
| $d_{12}$  | 1.25  | 6.45  | 4.81  |
| $d_{14}$  | 3.21  | 1.29  | 0.07  |

TABLE 12

Zoom Data (∞)

|       | WE    | ST    | TE    |
|-------|-------|-------|-------|
| f (mm)    | 8.14  | 13.81 | 23.37 |
| $F_{NO}$  | 1.85  | 2.47  | 3.85  |
| 2ω(°)     | 60.83 | 35.75 | 21.47 |
| $d_2$     | 20.70 | 9.76  | 6.47  |
| $d_8$     | 3.54  | 6.20  | 17.38 |
| $d_{12}$  | 1.23  | 5.56  | 4.71  |
| $d_{14}$  | 3.18  | 1.24  | 0.03  |

Example 6

| | | | |
|---|---|---|---|
| $r_1 = -22.016*$ | $d_1 = 0.90$ | $n_{d1} = 1.43875$ | $\nu_{d1} = 94.93$ |
| $r_2 = 15.461*$ | $d_2 =$ variable | | |
| $r_3 = 14.701*$ | $d_3 = 2.06$ | $n_{d2} = 1.74320$ | $\nu_{d2} = 49.34$ |
| $r_4 = -32.999*$ | $d_4 = 0.10$ | | |
| $r_5\ 6.405*$ | $d_5 = 2.89$ | $n_{d3} = 1.80610$ | $\nu_{d3} = 40.92$ |
| $r_6 = 33.244$ | $d_6 = 0.50$ | $n_{d4} = 2.00069$ | $\nu_{d4} = 25.46$ |
| $r_7 = 4.856$ | $d_7 = 1.72$ | | |
| $r_8 = \infty$ (S) | $d_8 =$ variable | | |
| $r_9 = -8.940$ | $d_9 = 0.80$ | $n_{d5} = 1.92286$ | $\nu_{d5} = 18.90$ |
| $r_{10} = -16.611$ | $d_{10} = 0.18$ | | |
| $r_{11} = 45.839*$ | $d_{11} = 2.55$ | $n_{d6} = 1.80610$ | $\nu_{d6} = 40.92$ |
| $r_{12} = -11.009*$ | $d_{12} =$ variable | | |
| $r_{13} = -10.879*$ | $d_{13} = 1.00$ | $n_{d7} = 1.52542$ | $\nu_{d7} = 55.78$ |
| $r_{14} = -7.731*$ | $d_{14} =$ variable | | |
| $r_{15} = \infty$ | $d_{15} = 0.74$ | $n_{d8} = 1.54771$ | $\nu_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 0.53$ | | |
| $r_{19} = \infty$ (I) | | | |

Example 7

| | | | |
|---|---|---|---|
| $r_1 = -22.274*$ | $d_1 = 0.90$ | $n_{d1} = 1.43875$ | $\nu_{d1} = 94.93$ |
| $r_2 = 15.613*$ | $d_2 =$ variable | | |
| $r_3 = 14.914*$ | $d_3 = 2.05$ | $n_{d2} = 1.74320$ | $\nu_{d2} = 49.34$ |
| $r_4 = -36.211*$ | $d_4 = 0.10$ | | |
| $r_5\ 6.740*$ | $d_5 = 2.89$ | $n_{d3} = 1.88300$ | $\nu_{d3} = 40.76$ |
| $r_6 = 30.586$ | $d_6 = 0.50$ | $n_{d4} = 2.00069$ | $\nu_{d4} = 25.46$ |
| $r_7 = 4.878$ | $d_7 = 1.72$ | | |
| $r_8 = \infty$ (S) | $d_8 =$ variable | | |
| $r_9 = -8.330$ | $d_9 = 0.80$ | $n_{d5} = 1.94595$ | $\nu_{d5} = 17.98$ |
| $r_{10} = -14.723$ | $d_{10} = 0.18$ | | |
| $r_{11} = 60.339*$ | $d_{11} = 2.55$ | $n_{d6} = 1.88300$ | $\nu_{d6} = 40.76$ |
| $r_{12} = -11.469*$ | $d_{12} =$ variable | | |
| $r_{13} = -11.106*$ | $d_{13} = 1.00$ | $n_{d7} = 1.52542$ | $\nu_{d7} = 55.78$ |
| $r_{14} = -7.881*$ | $d_{14} =$ variable | | |
| $d_{15} = \infty$ | $d_{15} = 0.74$ | $n_{d8} = 1.54771$ | $\nu_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 0.40$ | | |
| $r_{19} = \infty$ (I) | | | |

TABLE 11-2

Aspherical coefficient

| | 1st surface | 2nd surface | 3rd surface | 4th surface | 5th surface |
|---|---|---|---|---|---|
| K | −0.519 | −2.161 | −0.175 | −17.775 | 0.037 |
| $A_4$ | $3.69695 \times 10^{-5}$ | $4.21993 \times 10^{-5}$ | $-9.06679 \times 10^{-6}$ | $-2.80828 \times 10^{-5}$ | $-3.97693 \times 10^{-5}$ |
| $A_6$ | $5.65774 \times 10^{-8}$ | $-1.75597 \times 10^{-7}$ | $-3.53110 \times 10^{-7}$ | $-1.49749 \times 10^{-7}$ | $-1.02246 \times 10^{-6}$ |
| $A_8$ | 0.000 | $8.97310 \times 10^{-9}$ | $-2.44657 \times 10^{-8}$ | $-1.08247 \times 10^{-8}$ | $-1.04292 \times 10^{-9}$ |
| $A_{10}$ | $3.73887 \times 10^{-12}$ | 0.000 | $2.47234 \times 10^{-10}$ | $1.49523 \times 10^{-10}$ | $-2.35540 \times 10^{-13}$ |

TABLE 11-2

| | 11th surface | 12th surface | 13th surface | 14th surface |
|---|---|---|---|---|
| K | −11.838 | −0.837 | −2.908 | 0.000 |
| $A_4$ | $-1.64575 \times 10^{-4}$ | $-6.41167 \times 10^{-5}$ | $-1.08544 \times 10^{-3}$ | 0.000 |
| $A_6$ | $-3.82233 \times 10^{-6}$ | $-6.74867 \times 10^{-6}$ | $4.99868 \times 10^{-5}$ | $4.25126 \times 10^{-5}$ |
| $A_8$ | $-2.40636 \times 10^{-7}$ | $-4.23546 \times 10^{-8}$ | 0.000 | $1.52833 \times 10^{-7}$ |
| $A_{10}$ | 0.000 | $-2.74519 \times 10^{-9}$ | 0.000 | 0.000 |

TABLE 13-1

Aspherical coefficient

|  | 1st surface | 2nd surface | 3rd surface | 4th surface | 5th surface |
|---|---|---|---|---|---|
| K | −0.518 | −2.161 | −0.175 | −17.775 | 0.036 |
| $A_4$ | $4.88141 \times 10^{-5}$ | $6.44536 \times 10^{-5}$ | $-1.92171 \times 10^{-5}$ | $-1.94577 \times 10^{-5}$ | $-2.54431 \times 10^{-5}$ |
| $A_6$ | $-3.21382 \times 10^{-8}$ | $-2.46896 \times 10^{-7}$ | $-3.89730 \times 10^{-7}$ | $-2.58431 \times 10^{-7}$ | $-5.58730 \times 10^{-7}$ |
| $A_8$ | 0.000 | $7.75334 \times 10^{-9}$ | $-1.82966 \times 10^{-8}$ | $-1.15784 \times 10^{-8}$ | $-5.36386 \times 10^{-10}$ |
| $A_{10}$ | $4.02767 \times 10^{-12}$ | 0.000 | $1.26317 \times 10^{-10}$ | $1.32488 \times 10^{-10}$ | $-6.90965 \times 10^{-12}$ |

TABLE 13-2

|  | 11th surface | 12th surface | 13th surface | 14th surface |
|---|---|---|---|---|
| K | −11.838 | −0.837 | −2.908 | 0.000 |
| $A_4$ | $-1.37364 \times 10^{-4}$ | $-5.64622 \times 10^{-5}$ | $-9.86766 \times 10^{-4}$ | 0.000 |
| $A_6$ | $-4.56316 \times 10^{-6}$ | $-6.19494 \times 10^{-6}$ | $3.81895 \times 10^{-5}$ | $3.39609 \times 10^{-5}$ |
| $A_8$ | $-3.54608 \times 10^{-8}$ | $3.58402 \times 10^{-8}$ | 0.000 | $5.27968 \times 10^{-8}$ |
| $A_{10}$ | 0.000 | $-1.10103 \times 10^{-9}$ | 0.000 | 0.000 |

TABLE 14

Zoom Data (∞)

|  | WE | ST | TE |
|---|---|---|---|
| f (mm) | 8.10 | 13.65 | 23.32 |
| $F_{NO}$ | 1.86 | 2.46 | 3.86 |
| 2ω(°) | 61.72 | 36.45 | 21.68 |
| $d_2$ | 20.69 | 9.75 | 6.43 |
| $d_8$ | 3.59 | 6.22 | 17.41 |
| $d_{12}$ | 1.26 | 5.55 | 4.68 |
| $d_{14}$ | 3.39 | 1.39 | 0.04 |

Figure 8A:
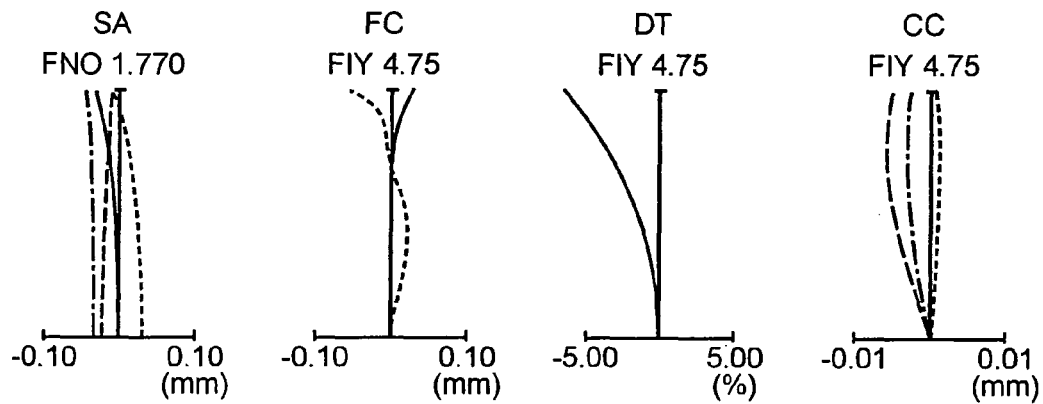
FIGS. 8A to 8C are diagrams showing a spherical aberration (SA), an astigmatism (FC), a distortion (DT) and a chromatic aberration of magnification (CC) of Example 1 when focused on the infinite object.
Figure 8B:
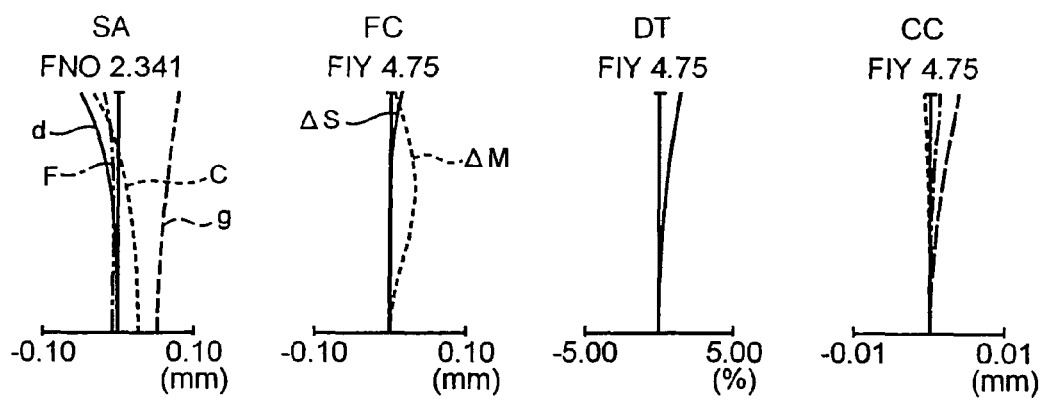
Figure 8C:
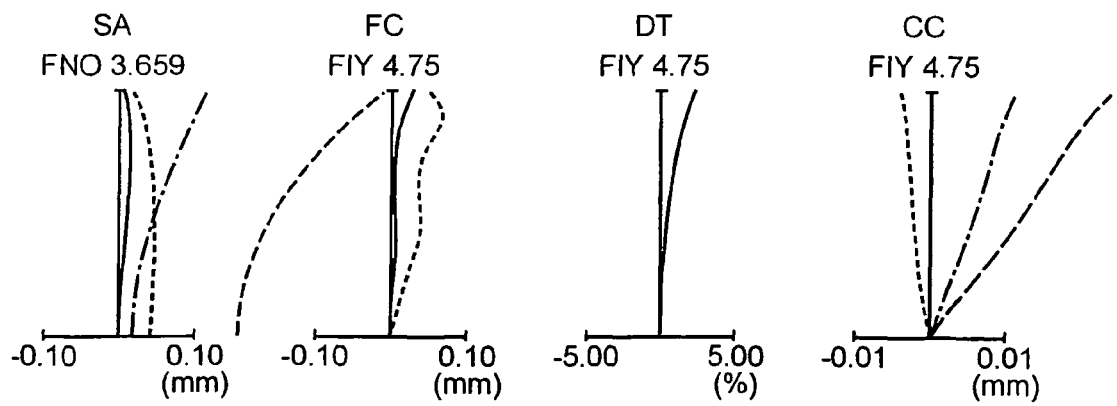
Figure 9A:
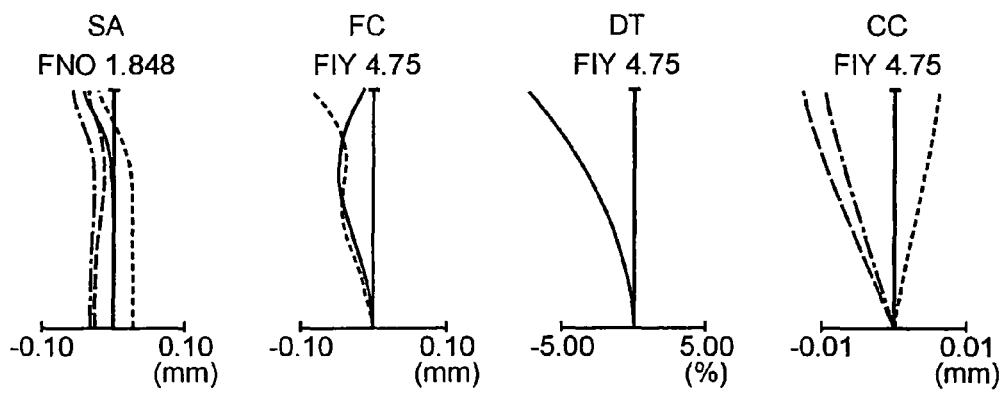
FIGS. 9A to 9C are diagrams showing a spherical aberration (SA), an astigmatism (FC), a distortion (DT) and a chromatic aberration of magnification (CC) of Example 2 when focused on the infinite object.
Figure 9B:
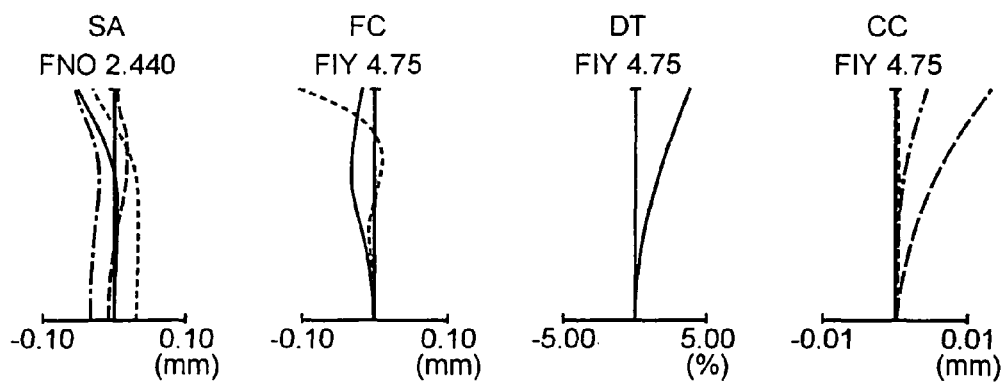
Figure 9C:
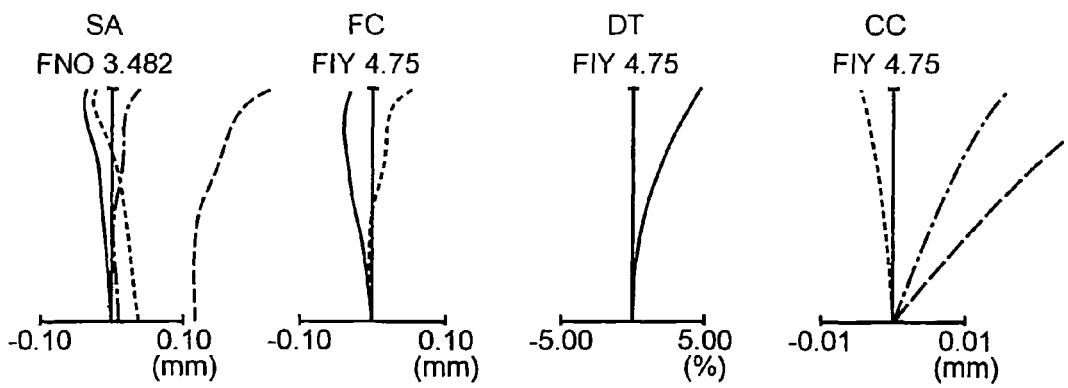
Figure 10A:
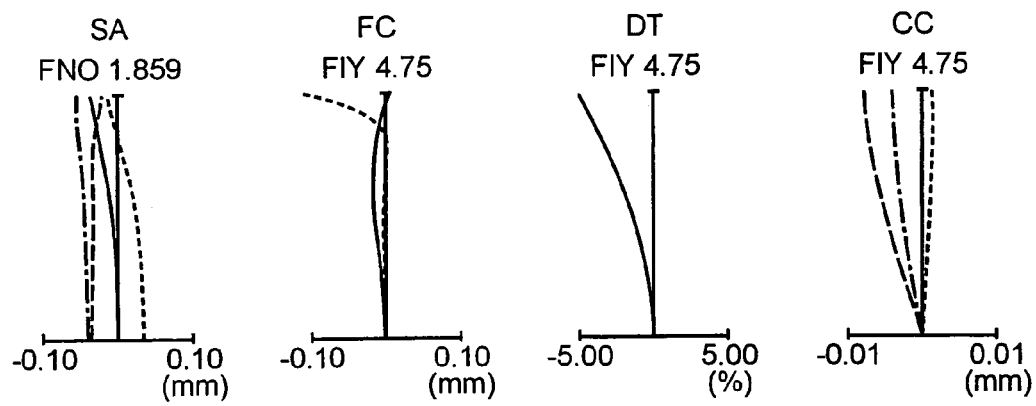
FIGS. 10A to 10C are diagrams showing a spherical aberration (SA), an astigmatism (FC), a distortion (DT) and a chromatic aberration of magnification (CC) of Example 3 when focused on the infinite object.
Figure 10B:
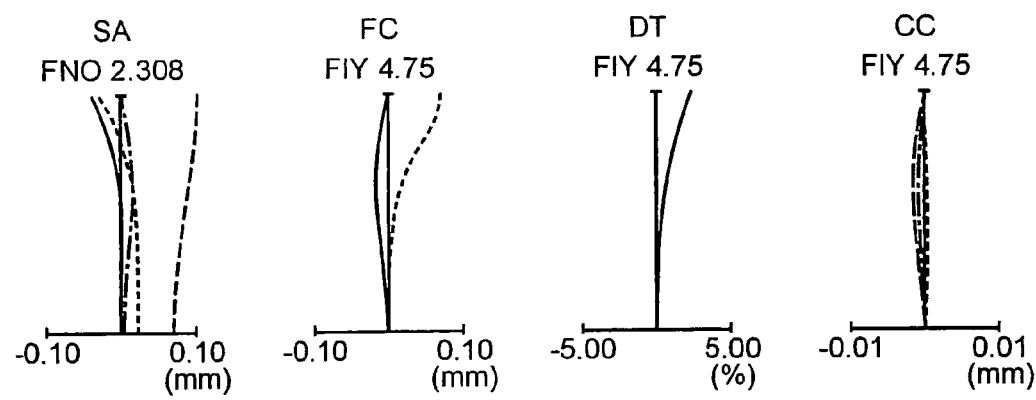
Figure 10C:
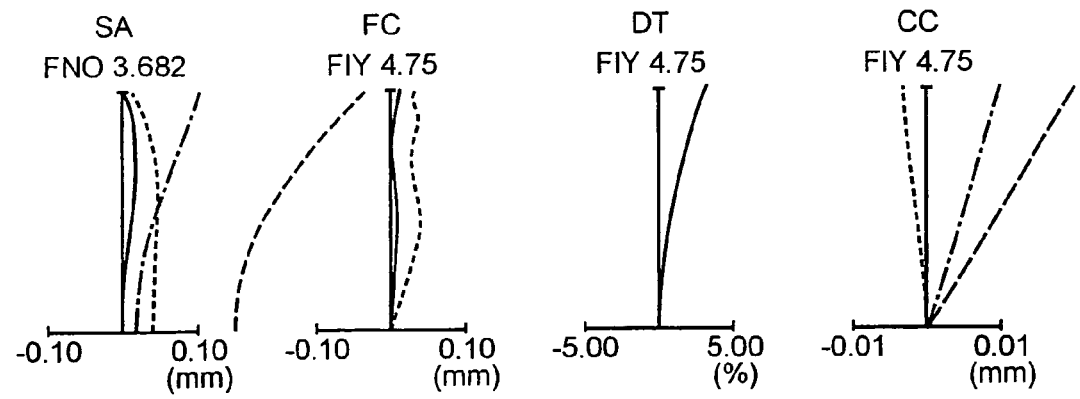
Figure 11A:
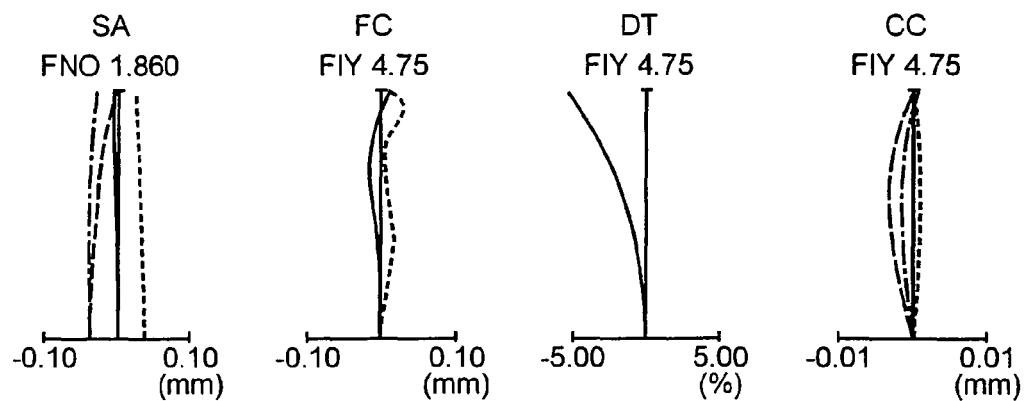
FIGS. 11A to 11C are diagrams showing a spherical aberration (SA), an astigmatism (FC), a distortion (DT) and a chromatic aberration of magnification (CC) of Example 4 when focused on the infinite object.
Figure 11B:
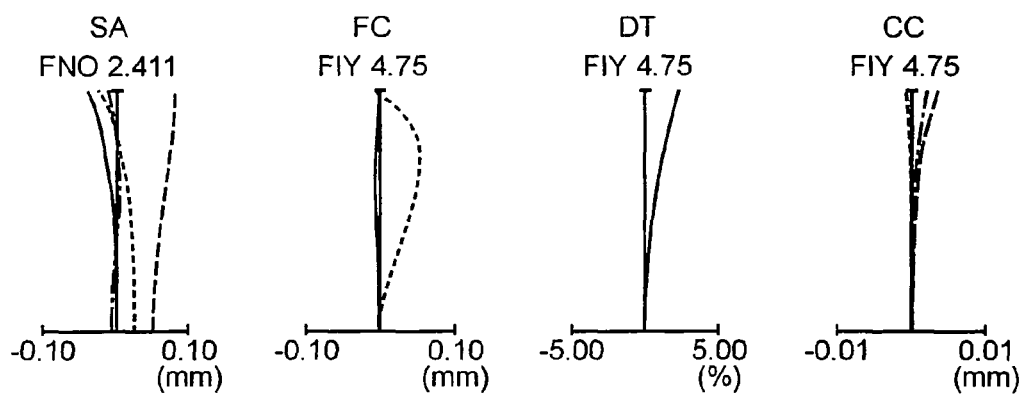
Figure 11C:
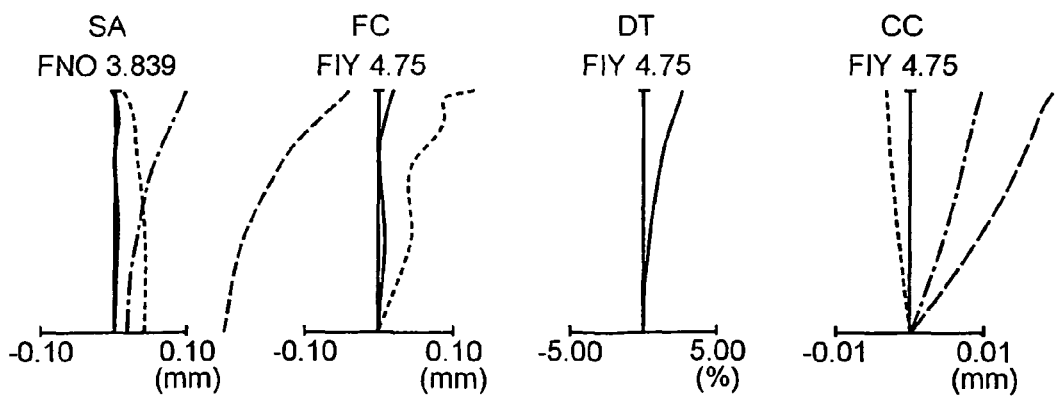
Figure 12A:
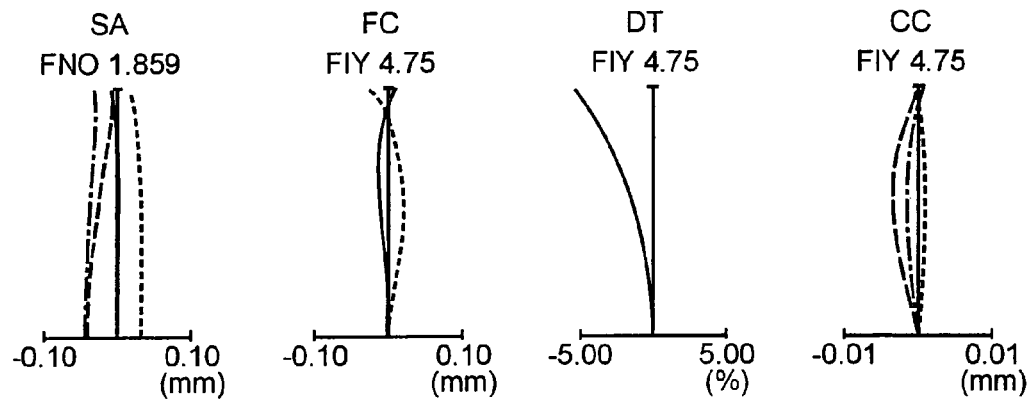
FIGS. 12A to 12C are diagrams showing a spherical aberration (SA), an astigmatism (FC), a distortion (DT) and a chromatic aberration of magnification (CC) of Example 5 when focused on the infinite object.
Figure 12B:
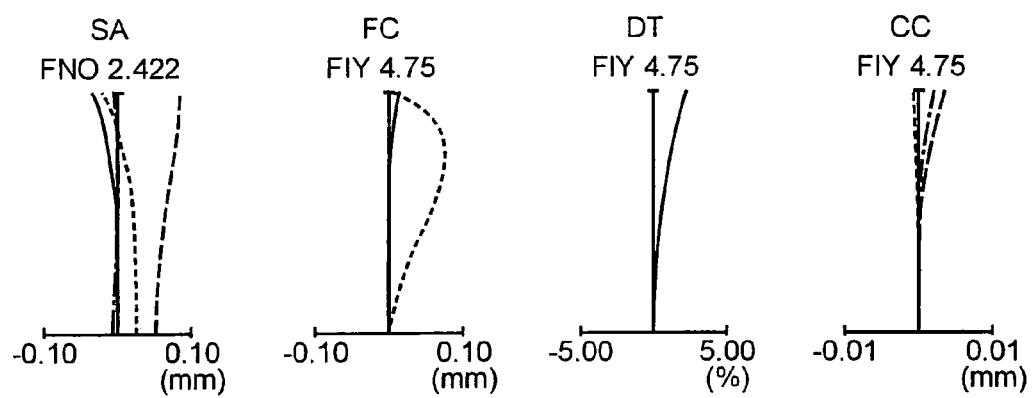
Figure 12C:
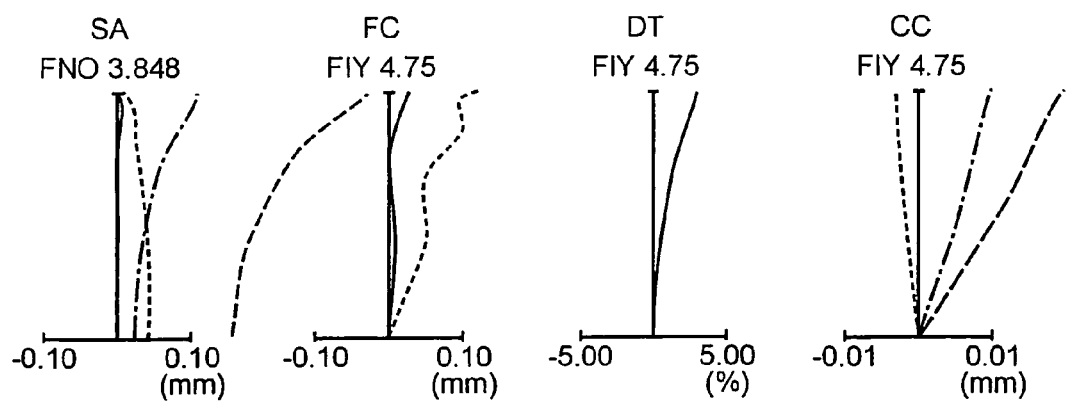
Figure 13A:
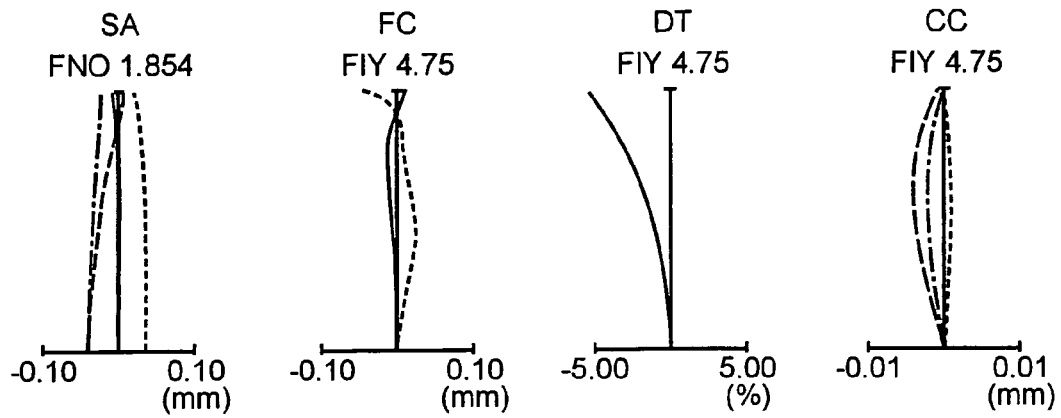
FIGS. 13A to 13C are diagrams showing a spherical aberration (SA), an astigmatism (FC), a distortion (DT) and a chromatic aberration of magnification (CC) of Example 6 when focused on the infinite object.
Figure 13B:
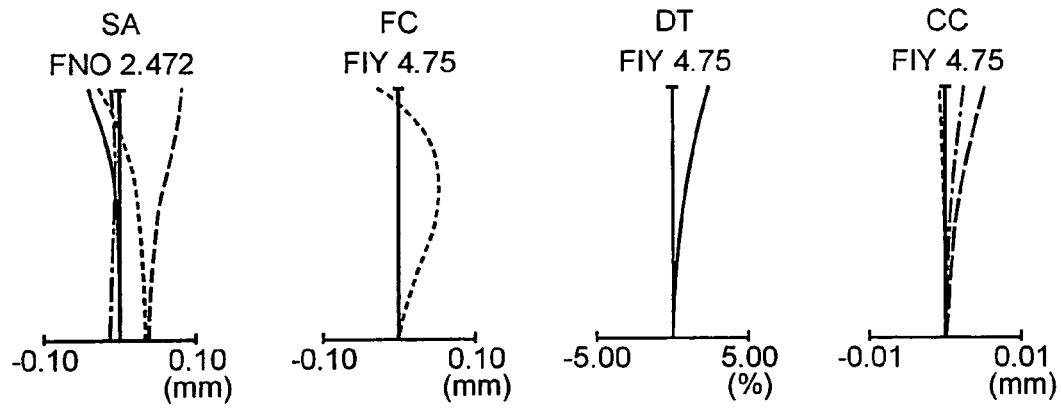
Figure 13C:
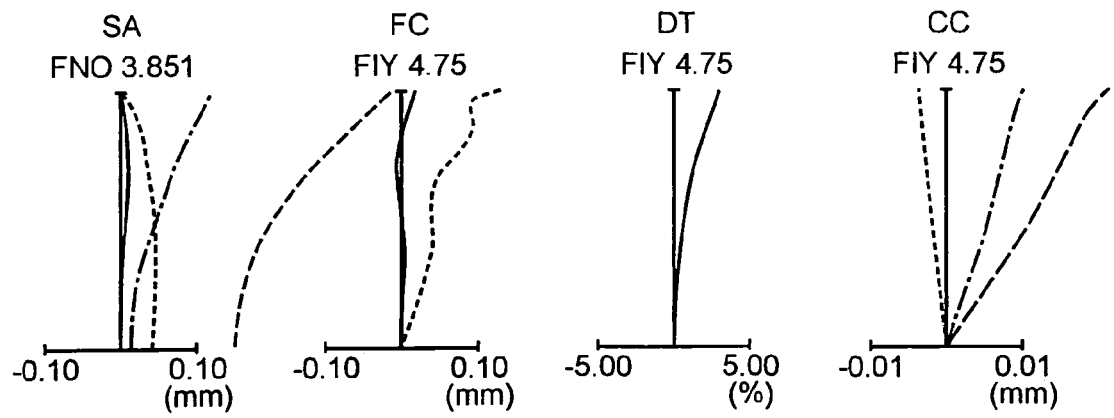
Figure 14A:
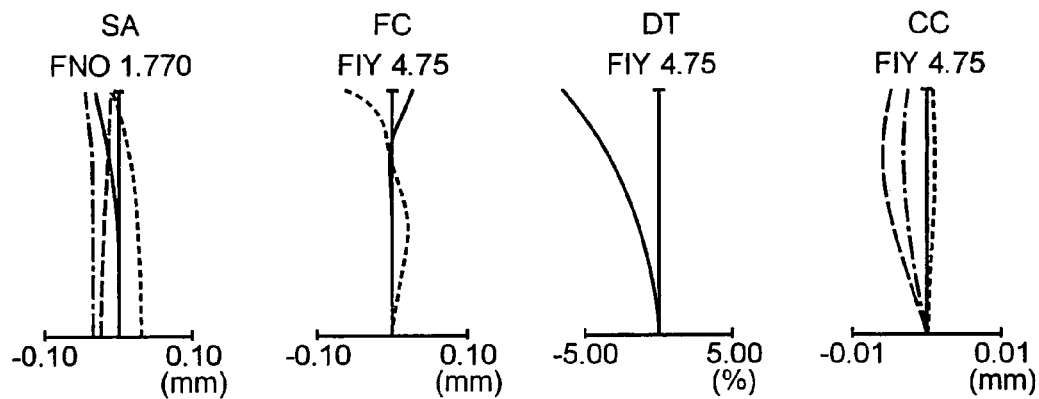
FIGS. 14A to 14C are diagrams showing a spherical aberration (SA), an astigmatism (FC), a distortion (DT) and a chromatic aberration of magnification (CC) of Example 7 when focused on the infinite object.
Figure 14B:
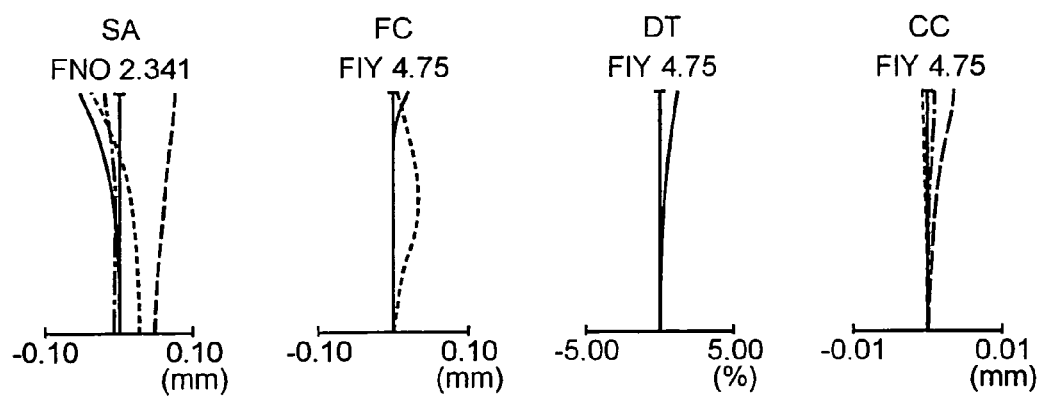
Figure 14C:
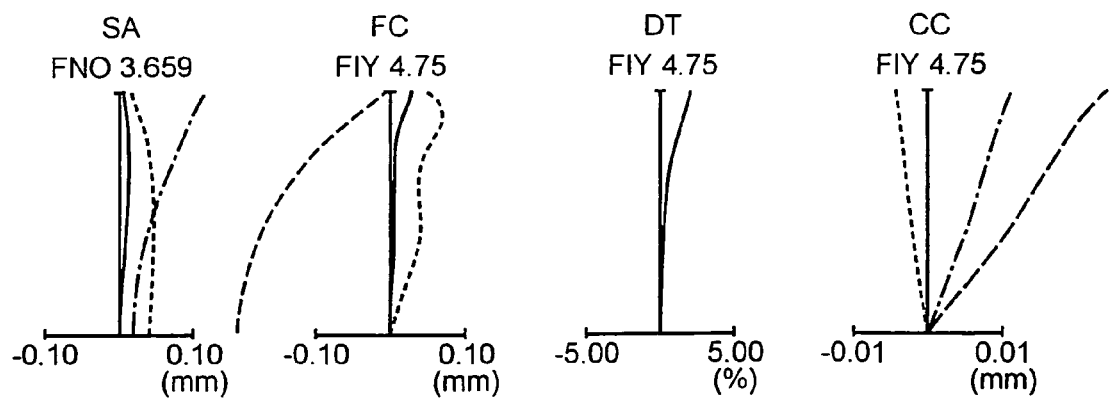

Aberration diagrams of Examples 1 to 7 when focused on the infinite object as described above are shown in FIGS. 8A to 14C. Among these aberration diagrams, FIGS. 8A, 9A, . . . show a spherical aberration (SA), an astigmatism (FC), a distortion (DT) and a chromatic aberration of magnification (CC) in a wide-angle end, FIGS. 8B, 9B, . . . show the aberrations in an intermediate state and FIGS. 8C, 9C, . . . show the aberrations in a telephoto end. In the drawings, "FIY" is a maximum image height.

Next, values of the conditions (1) to (16) in the above examples will be described.

These examples are directed to a compact zoom lens system having a zoom ratio which is as large as about threefold; an angle of field which is as large as about 60° in the wide-angle end; a full aperture F-value which is as bright as about 1.8 in the wide-angle end; and a satisfactory optical performance in the whole magnification change region and the whole photographing distance.

The above zoom lens systems can be combined with an image sensor to constitute an electronic image pickup unit. In this case, the image sensor is disposed at a position where an object image formed by the zoom lens system is received.

Moreover, the above zoom lens system can be used in a photographing apparatus in which the object image is formed by the zoom lens system and received by the image sensor to photograph the object. Specific examples of the photographing apparatus include an electronic camera such as a digital camera; and information processing units such as a personal computer in which a camera is incorporated and is portable terminal devices, for example, a cellular phone and a personal digital assistant (PDA) in which a camera is incorporated.

Figure 15:
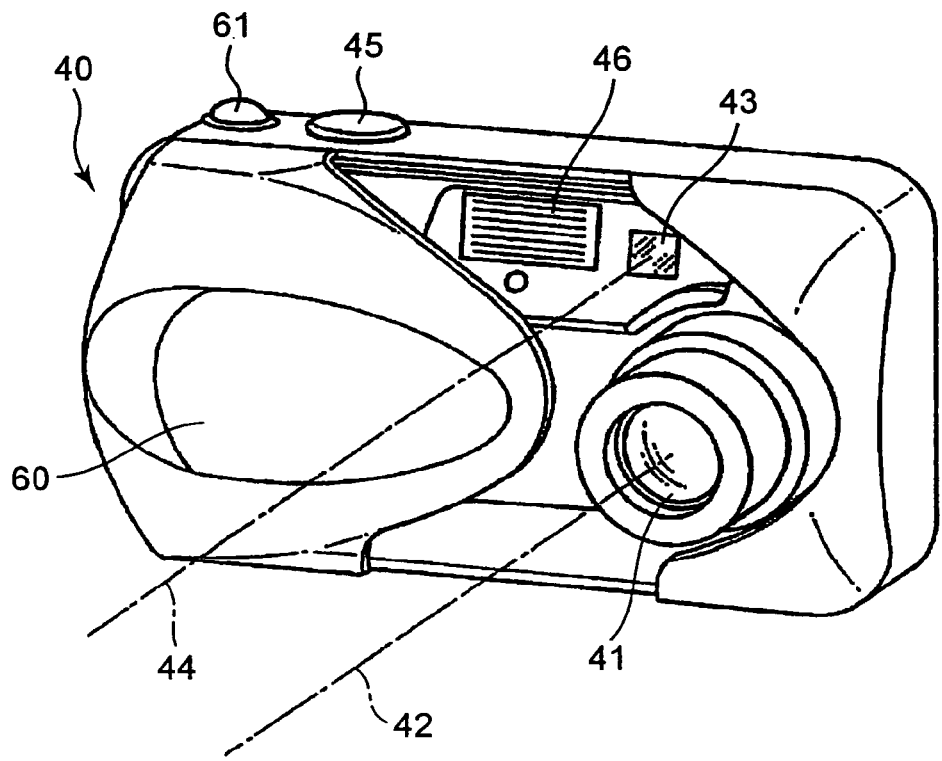
FIG. 15 is a front perspective view showing an appearance of a digital camera using the zoom lens system of the present invention.
Figure 16:
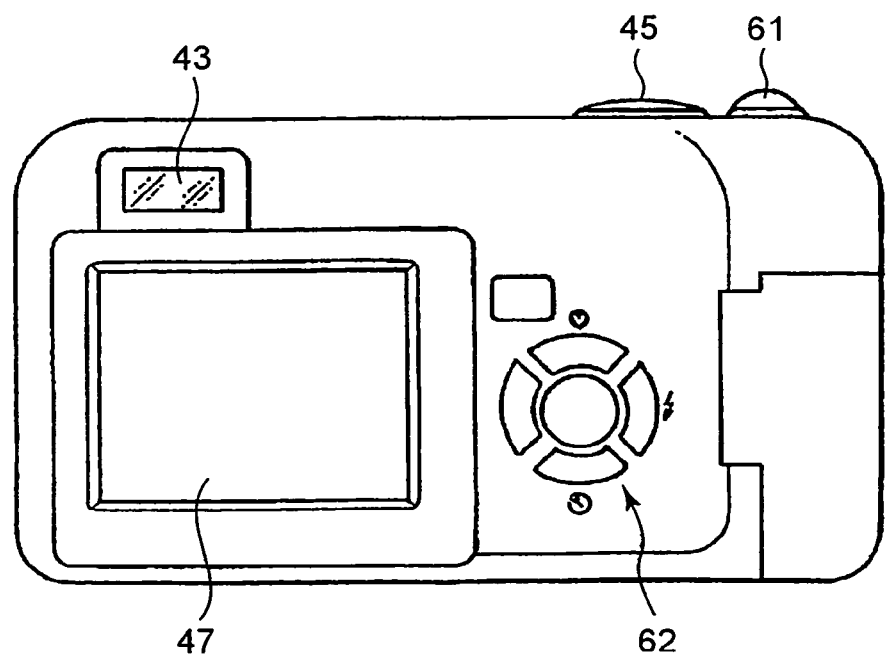
FIG. 16 is a rear view of the digital camera of FIG. 15.
Figure 17:
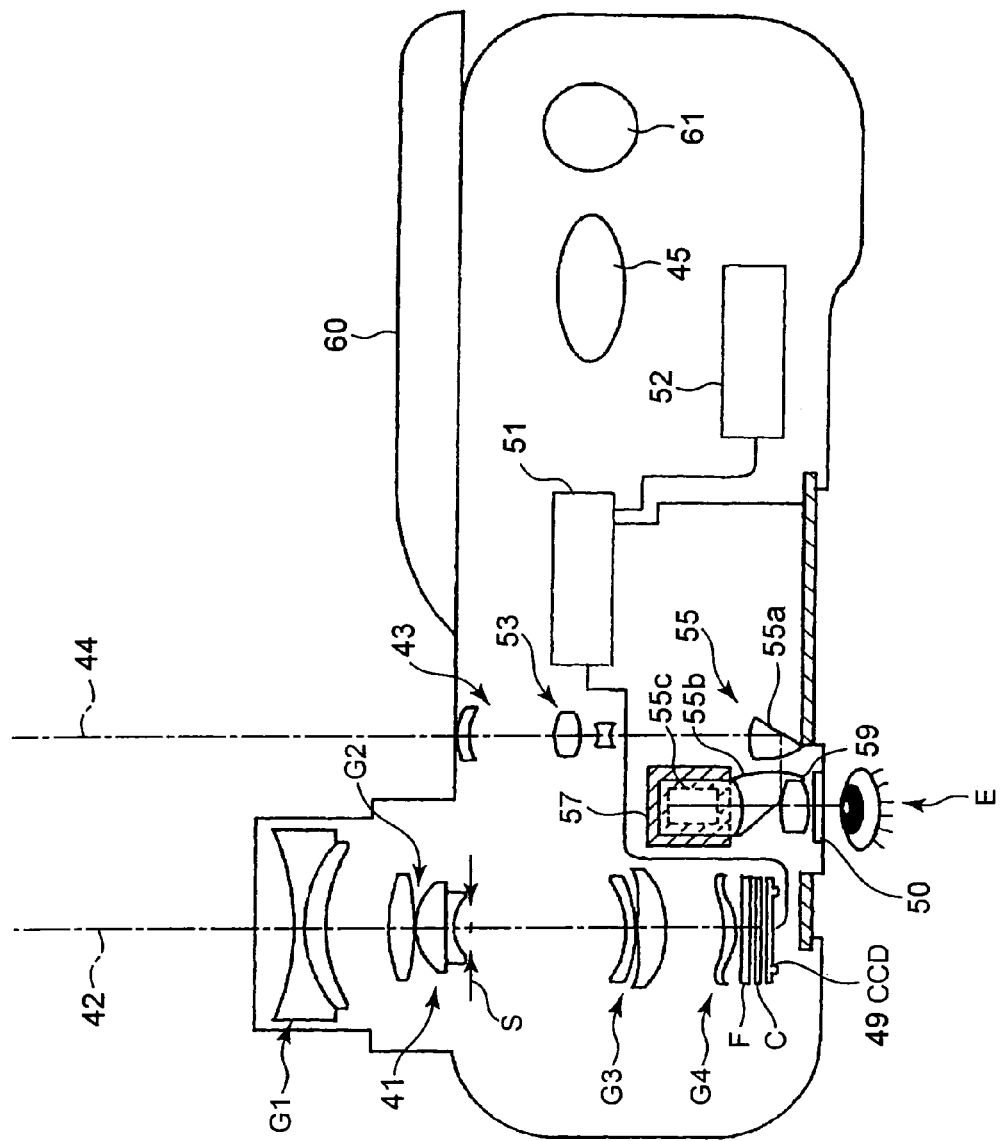
FIG. 17 is an explanatory view showing an inner constitution of the digital camera of FIG. 15.

FIGS. 15 to 17 are conceptual diagrams showing a constitution of a digital camera in which the zoom lens system according to the present invention is incorporated as a photographing optical system. FIG. 15 is a front perspective view

TABLE 15

| Conditions | Example 1 | Example 2 | Example 3 | Example 4 | Example 5 | Example 6 | Example 7 |
|---|---|---|---|---|---|---|---|
| (1) | −2.565 | −2.728 | −2.261 | −1.966 | −1.976 | −1.965 | −1.946 |
| (2) | −5.702 | −5.869 | −5.321 | −3.405 | −3.407 | −3.331 | −3.606 |
| (3) | 1.923 | 1.923 | 1.923 | 1.923 | 1.923 | 1.923 | 1.946 |
| (4) | 18.900 | 18.900 | 18.900 | 18.900 | 18.900 | 18.900 | 17.984 |
| (5) | 0.610 | 0.579 | 0.718 | 0.633 | 0.626 | 0.646 | 0.656 |
| (6) | — | 18.900 | 18.900 | 18.900 | 18.900 | 18.900 | 94.930 |
| (7) | 0.155 | −0.092 | 0.366 | 0.199 | 0.207 | 0.175 | 0.176 |
| (8) | 0.594 | 0.581 | 0.656 | 0.611 | 0.606 | 0.597 | 0.602 |
| (9) | 2.001 | 1.839 | 1.839 | 2.001 | 2.001 | 2.001 | 2.001 |
| (10) | 25.458 | 23.855 | 23.855 | 25.458 | 25.458 | 25.458 | 25.458 |
| (11) | −2.533 | −3.164 | −2.522 | −2.500 | −2.505 | −2.525 | −2.564 |
| (12) | 1.707 | 1.774 | 1.693 | 1.667 | 1.668 | 1.682 | 1.696 |
| (13) | 2.770 | 1.888 | 2.497 | 2.358 | 2.349 | 2.322 | 2.305 |
| (14) | 5.815 | 5.451 | 5.371 | 5.358 | 5.358 | 5.354 | 5.397 |
| (15) | 2.028 | 1.666 | 1.827 | 1.846 | 1.845 | 1.852 | 1.849 |
| (16) | 10.816 | 10.072 | 9.983 | 9.965 | 9.959 | 9.924 | 10.025 | showing an appearance of a digital camera; FIG. 16 is a rear view of the camera; and FIG. 17 is a schematic sectional view showing a constitution of the digital camera. In addition, in FIGS. 15 and 17, a non-collapsible state of the photographing optical system 41 is shown. In this example, the digital camera 40 includes a photographing optical system 41 positioned along a photographing optical path 42; a finder optical system 43 positioned along an optical path 44 for a finder; a shutter button 45; a flash lamp 46; a liquid crystal display monitor 47; a focal length change button 61; a setting change switch 62 and the like. In a case where the photographing optical system 41 is collapsed, when a cover 60 is slid, the photographing optical system 41, the finder optical system 43 and the flash lamp 46 are covered with the cover 60. Moreover, when the cover 60 is opened to bring the camera 40 into a photographing state, the photographing optical system 41 is brought into the non-collapsed state shown in FIG. 17. When the shutter button 45 disposed at an upper portion of the camera 40 is pressed, the photographing is performed through the photographing optical system 41, for example, the zoom lens system of Example 1, in response to the pressed button. An object image is formed by the photographing optical system 41 on an image pickup surface (a photoelectric conversion surface) of a CCD image sensor 49 via a low pass filter F and a cover glass C provided with a wavelength band restrictive coating. This object image received by this CCD image sensor 49 is displayed as an electronic image in the liquid crystal display monitor 47 disposed in a rear surface of the camera via a processing section 51. This processing section 51 is connected to a recording section 52, and the photographed electronic image can be recorded. It is to be noted that this recording section 52 may be integrated with the processing section 51, or the sections may separately be arranged. As a medium in which the electronic image is recorded, a hard disk drive (HDD), a memory card, an optical disk such as a DVD±RW or the like is usable. A film camera may be constituted in which a silver halide film is disposed Instead of the CCD image sensor 49.

Furthermore, an objective optical system 53 for the finder is disposed along the optical path 44 for the finder. The objective optical system 53 for the finder is constituted of a zoom optical system including a plurality of lens units (three lens units in the drawing) and an image erecting prism system 55 constituted of image erecting prisms 55a, 55b and 55c. In the system, a focal length changes in conjunction with the zoom lens system of the photographing optical system 41. The object image is formed by the objective optical system 53 for the finder on a view field frame 57 of the image erecting prism system 55. Behind the image erecting prism system 55, an eyepiece optical system 59 is disposed which guides an erected image into an observer's eyeball E. It is to be noted that a cover member 50 is disposed on an emission side of the eyepiece optical system 59.

Figure 18:
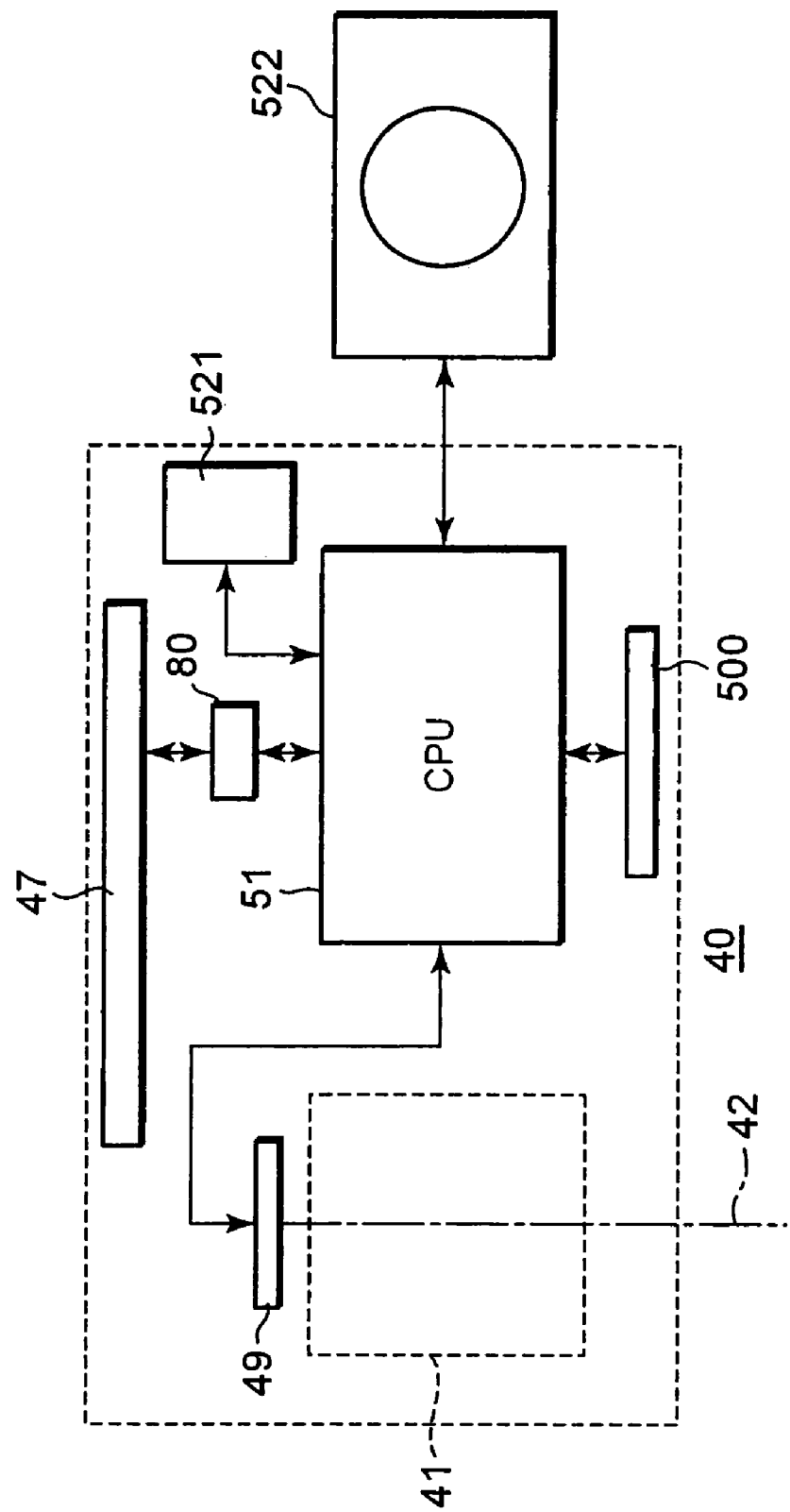
FIG. 18 is a schematic block diagram showing a main part of a control system of the digital camera shown in FIG. 15.

FIG. 18 shows a schematic block diagram of a main part of a control system of the digital camera 40. It is to be noted that an input section typified by the shutter button 45 is denoted with reference numeral 500. A CPU 51 corresponds to the processing section of FIG. 17. A recording section includes a memory card 521 and an external storage device (an optical disk, an HDD or the like) 522. A display processing section 80 is omitted from FIG. 17. The section performs display processing to display an image or information in the display section 47 by use of an output from the CPU 51. In a case where the CPU 51 judges that the shutter button 45 of the input section 500 is pressed, appropriate control values such as a shutter speed and a aperture diameter are calculated using information obtained from a photometry system (not shown). After the calculation, a shutter and an aperture stop are controlled based on the control values.

The digital camera is an example of an electronic camera including the zoom lens system according to the present invention; an image sensor disposed at a position where an object image formed by the zoom lens system is received; a CPU which processes an electric signal photoelectrically converted by the image sensor; a display element which displays the object image received by the image sensor so as to observe the image; a recording processing section which records the object image received by the image sensor in a recording medium; and the recording medium incorporated in the electronic camera and/or constituted so as to be detachably attached to the electronic camera in order to record image information of the object image received by the image sensor. The CPU performs control so as to displays the object image received by the image sensor in the display element, and also performs control so as to record the object image received by the image sensor in the recording medium.

Figure 19:
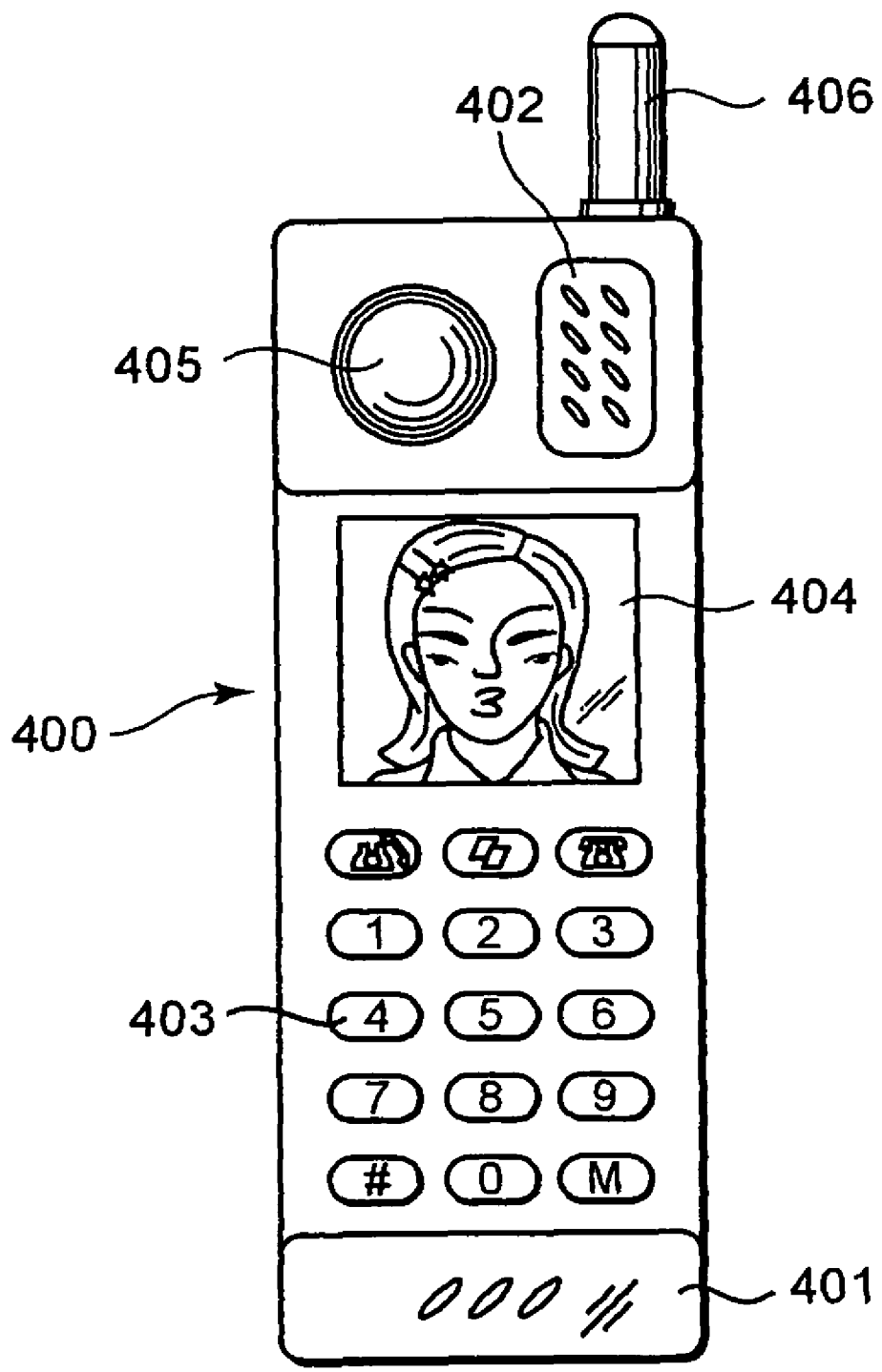
FIG. 19 is a front view of a cellular phone.
Figure 20:
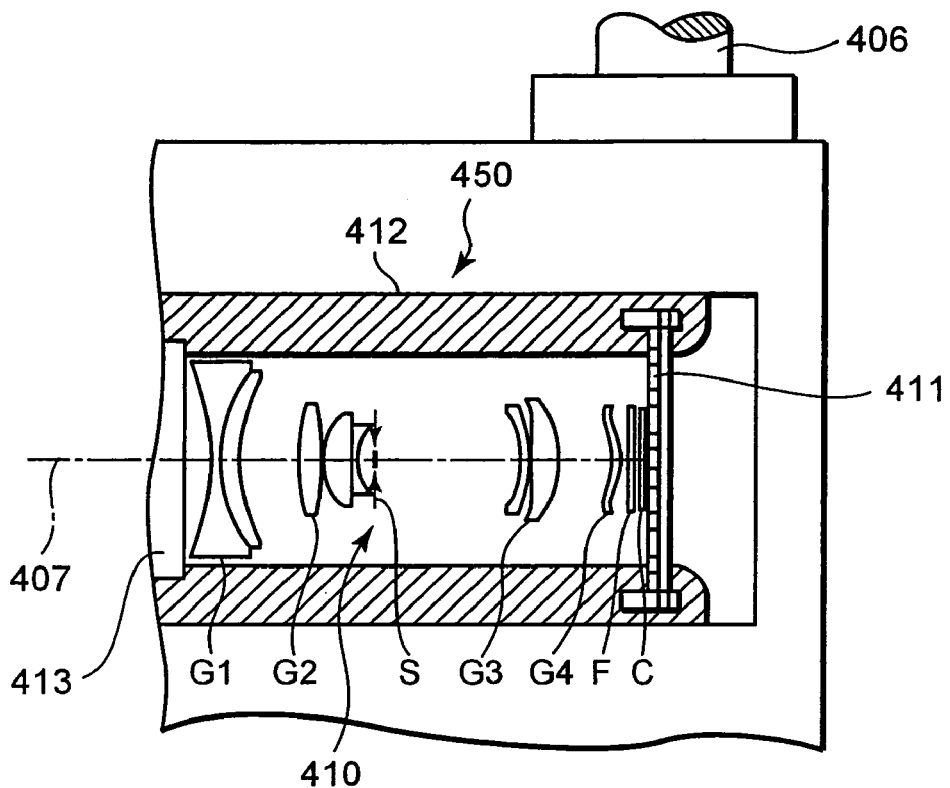
FIG. 20 is a sectional view of a photographing optical system incorporated in the cellular phone.
Figure 21:
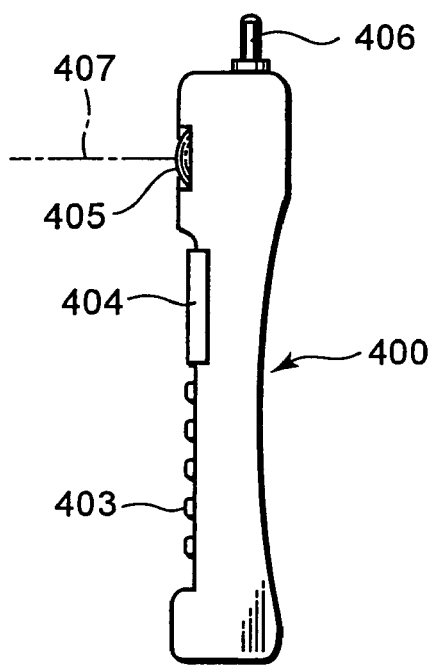
FIG. 21 is a side view of the cellular phone.

Next, a cellular phone provided with a camera using the zoom lens system according to the present invention will be described with reference to FIGS. 19 to 21. FIG. 19 is a front view of the cellular phone; FIG. 20 is a sectional view of a photographing optical system incorporated in the cellular phone; FIG. 21 is a side view of the cellular phone; and FIG. 22 is a schematic block diagram showing a main part of a control system related to photographing, image recording and image display of the cellular phone.

As shown in FIGS. 19 to 21, a cellular phone 400 has a microphone 401 which inputs operator's voice as information; a speaker 402 which outputs partner's voice; input keys 403 via which an operator inputs information; a monitor 404 which displays an image obtained by photographing the operator, the surrounding scenery or the like, or information such as telephone numbers; a photographing optical system 405; an antenna 406 which transmits and receives a communication radio wave; a processing section which processes image information, communication information, an input signal and the like; and a recording section which records the image. Here, the monitor 404 is a liquid crystal displayed element. Here, the monitor 404 may be a transmission type liquid crystal display element which is illuminated from the rear by a backlight (not shown), a reflective type liquid crystal display element which reflects light entering the element from a front surface to display the information or the like.

The photographing optical system 405 has a photographing lens system 410 including the zoom lens system according to the present invention disposed along a photographing optical path 407; and an image sensor chip 411 which receives an object image formed by the photographing lens system 410. A cover glass C is attached on the image sensor chip 411. These components are incorporated in the cellular phone 400.

Here, the image sensor chip 411 is fitted into a rear end of a lens barrel 412 of the photographing lens system 410 through a on-touch operation and constitutes an electronic image pickup unit 450 with the lens barrel and the photographing lens system. Therefore, centering of the photographing lens system 410 and the image sensor chip 411 need not be adjusted, an interval between the image sensor chip 411 and the photographing lens system need not be adjusted, and assembling is facilitated. A cover glass 413 for protecting the photographing lens system 410 is disposed on a tip end of the lens barrel 412. It is to be noted that a driving mechanism of the zoom lens system in the lens barrel 412 is omitted from the drawing.

The object image received by the image sensor chip 411 is input into the processing section via a terminal (not shown), and displayed as an electronic image in the monitor 404 and/or a partner's monitor. In a case where the image is transmitted to the partner, a signal processing function of converting information of the object image received by the image sensor chip 411 into a transmittable signal is included in the processing section.

FIG. 22 shows a schematic block diagram of the main part of the control system related to the photographing, image recording and image display of the cellular phone 400. It is to be noted that an input section such as the input keys 403 is denoted with reference numeral 500. A CPU 415 corresponds to the above processing section, and a memory card 521 and an external storage device (the HDD or the like) 522 correspond to the recording section. A display processing section 480 performs display processing to display an image or information in a display section 404 by use of an output from the CPU 415. In a case where the CPU 415 judges that information corresponding to a photographing instruction is input from the input section 500, appropriate control values such as a shutter speed and an aperture diameter are calculated using information obtained from a photometry system (not shown). After the calculation, a shutter and an aperture stop are controlled based on the control values. It is to be noted that to simplify the constitution, one or both of the shutter speed control and the aperture value control can be omitted.

This cellular phone provided with the camera is an example of an information processing device including the zoom lens system according to the present invention; an image sensor disposed at a position where an object image formed by the zoom lens system is received; a CPU which processes an electric signal photoelectrically converted by the image sensor; an input section which inputs an information signal to be input into the CPU by an operator; a display processing section which displays an output from the CPU in a display unit (e.g., an LCD); and a recording medium which records the output from the CPU. The CPU is configured to perform control so as to display the object image received by the image sensor in the display unit.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
   a first lens unit having a negative refractive power, wherein the total number of lens elements included in the first lens unit is at least one but no more than two;
   a second lens unit having a positive refractive power; and
   a third lens unit having a positive refractive power, wherein a space between the lens units is changed to perform magnification change;
   the second lens unit includes a negative lens;
   a lens of the second lens unit closest to an image side has a concave surface which faces the image side;
   a lens of the third lens unit closest to the object side is a meniscus lens whose concave surface faces the object side;
   the third lens unit includes the meniscus lens and a positive lens; and
   during the magnification change, the space between the second lens unit and the third lens unit is larger in a telephoto end than in a wide-angle end.

2. The zoom lens system according to claim 1, wherein the meniscus lens is a single lens.

3. The zoom lens system according to claim 1, wherein the positive lens is a single lens.

4. The zoom lens system according to claim 1, wherein the number of lenses that the third lens unit includes is two.

5. The zoom lens system according to claim 1, wherein the meniscus lens is a negative lens; and
   the negative lens of the third lens unit closest to the object side satisfies the following condition:

$$-7.90 < SF_{3n} < -1.20 \quad (2),$$

in which $SF_{3n}$ is defined by $SF_{Rn} = (R_{3lf} + R^{3lr})/(R_{3lf} - R_{3lr})$ and in which $R_{3lf}$, $R_{3lr}$ are paraxial radii of curvatures of an object-side surface and an image-side surface of the negative lens of the third lens unit, respectively.

6. The zoom lens system according to claim 1, wherein the meniscus lens is a negative lens; and
   the negative lens of the third lens unit closest to the object side satisfies the following conditions:

$$1.75 < n_{d3n} < 2.20 \quad (3); \text{ and}$$

$$13.0 < v_{d3n} < 33.0 \quad (4),$$

in which $n_{d3n}$ and $v_{d3n}$ are a refractive index and the Abbe number of the negative lens of the third lens unit closest to the object side for the d-line, respectively.

7. The zoom lens system according to claim 1, wherein the following condition is satisfied:

$$0.35 < d_{23}/f_w < 1.25 \quad (5),$$

in which $d_{23}$ is an axial space between the second lens unit and the third lens unit in the wide-angle end, and $f_w$ is a focal length of the zoom lens system in the wide-angle end.

8. The zoom lens system according to claim 1, wherein the first lens unit includes one negative lens.

9. The zoom lens system according to claim 1, wherein an aperture stop is disposed between the second lens unit and the third lens unit.

10. The zoom lens system according to claim 1, wherein the following condition is satisfied:

$$5.0 < Fno_w \times L_w/f_w < 17.0 \quad (16),$$

in which $Fno_w$ is a full aperture F-value in the wide-angle end, $L_w$ is the total length of the zoom lens system in the wide-angle end, and $f_w$ is a focal length of the zoom lens system in the wide-angle end.

11. An electronic image pickup unit comprising:
   the zoom lens system according to claim 1; and
   an image sensor disposed at a position where an object image formed by the zoom lens system is received.

12. An information processing device comprising:
   the zoom lens system according to claim 1;
   an image sensor disposed at a position where an object image formed by the zoom lens system is received;
   a CPU which processes an electric signal photoelectrically converted by the image sensor;
   an input section which inputs an information signal to be input into the CPU by an operator;
   display processing section for displaying an output from the CPU in a display unit; and
   a recording medium which records the output from the CPU, wherein the CPU is configured to perform control so as to display the object image received by the image sensor in the display unit.

13. The information processing device according to claim 12, which is a portable terminal device.

14. An electronic camera device comprising:
the zoom lens system according to claim 1;
an image sensor disposed at a position where an object image formed by the zoom lens system is received;
a CPU which processes an electric signal photoelectrically converted by the image sensor;
a display element which displays the object image received by the image sensor so as to observe the image; and
a recording processing section which records the object image received by the image sensor in a recording medium; and
the recording medium incorporated in the electronic camera device and/or constituted so as to be detachably attached to the electronic camera device in order to record image information of the object image received by the image sensor,
wherein the CPU is configured to perform control so as to display the object image received by the image sensor in the display element and to record the object image received by the image sensor in the recording medium.

15. A zoom lens system comprising, in order from an object side:
a first lens unit having a negative refractive power, wherein the first lens unit includes one negative lens which satisfies the following condition:

$$75.0 < v_{d1n} < 105.0 \qquad (6),$$

in which $v_{d1n}$ is the Abbe number of the negative lens of the first lens unit;
a second lens unit having a positive refractive power; and
a third lens unit having a positive refractive power,
wherein a space between the lens units is changed to perform magnification change;
the second lens unit includes a negative lens;
a lens of the second lens unit closest to an image side has a concave surface which faces the image side;
a lens of the third lens unit closest to the object side is a meniscus lens whose concave surface faces the object side;
the third lens unit includes the meniscus lens and a positive lens; and
during the magnification change, the space between the second lens unit and the third lens unit is larger in a telephoto end than in a wide-angle end.

16. The zoom lens system according to claim 15, wherein the negative lens of the first lens unit satisfies the following condition:

$$0.01 < SF_{1n} < 1.00 \qquad (7),$$

in which $SF_{1n}$ is defined by $SF_{1n} = (R_{1lf} + R_{1lr})/(R_{1lf} - R_{1lr})$ and in which $R_{1lf}$, $R_{1lr}$ are paraxial radii of curvatures of an object-side surface and an image-side surface of the negative lens of the first lens unit, respectively.

17. A zoom lens system comprising, in order from an object side:
a first lens unit having a negative refractive power, wherein the first lens unit includes a cemented lens of a negative lens and a positive lens, and wherein the total number of lens elements included in the first lens unit is two;
a second lens unit having a positive refractive power; and
a third lens unit having a positive refractive power,
wherein a space between the lens units is changed to perform magnification change;
the second lens unit includes a negative lens;
a lens of the second lens unit closest to an image side has a concave surface which faces the image side;
a lens of the third lens unit closest to the object side is a meniscus lens whose concave surface faces the object side;
the third lens unit includes the meniscus lens and a positive lens; and
during the magnification change, the space between the second lens unit and the third lens unit is larger in a telephoto end than in a wide-angle end.

* * * * *